(12) United States Patent
Sima et al.

(10) Patent No.: US 12,094,046 B1
(45) Date of Patent: Sep. 17, 2024

(54) DIGITAL HUMAN DRIVING METHOD AND APPARATUS, AND STORAGE MEDIUM

(71) Applicant: NANJING SILICON INTELLIGENCE TECHNOLOGY CO., LTD., Jiangsu (CN)

(72) Inventors: Huapeng Sima, Nanjing (CN); Jintai Luan, Nanjing (CN); Hongwei Fan, Nanjing (CN); Jiabin Li, Nanjing (CN); Hao Jiang, Nanjing (CN); Qixun Qu, Nanjing (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/419,759

(22) Filed: Jan. 23, 2024

(30) Foreign Application Priority Data

Jul. 12, 2023 (CN) .......................... 202310847425.5

(51) Int. Cl.
G06T 19/20 (2011.01)
G06T 7/20 (2017.01)
(Continued)

(52) U.S. Cl.
CPC ............... *G06T 13/40* (2013.01); *G06T 7/80* (2017.01); *G06T 19/00* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

2023/0186583 A1 6/2023 Guo
2023/0290101 A1* 9/2023 Yang .................... H04N 13/207

FOREIGN PATENT DOCUMENTS

CN 103400409 A 11/2013
CN 114092670 A 2/2022
(Continued)

OTHER PUBLICATIONS

Junchao Zhu et al, "Study on the Construction of a Time-Space Four-Dimensional Combined Imaging Model and Moving Target Location Prediction Model", Sensors 2022, 22(17), 6375; https://doi.org/10.3390/s22176375; Published: Aug. 24, 2022 (Year: 2022).*
(Continued)

*Primary Examiner* — Tize Ma
(74) *Attorney, Agent, or Firm* — REISING ETHINGTON P.C.

(57) ABSTRACT

A digital human driving method and apparatus are provided which relate to computer and image processing, and can solve the problem of shaking, joint rotation malposition and partial loss of a digital human during a driving process. The solution includes: capturing video data from multiple angles of view in a real three-dimensional space by multiple video capture devices; determining a first coordinate of a key point of the target human; determining a mapping relationship based on the first coordinate; calculating a second coordinate based on the mapping relationship and the first coordinate; processing the second coordinate according to a key point rotation model to obtain rotation value of the virtual key point in the virtual three-dimensional space; and driving the digital human to move based on the rotation value of the virtual key point in the virtual three-dimensional space.

7 Claims, 12 Drawing Sheets

(51) Int. Cl.
  *G06T 7/80*   (2017.01)
  *G06T 13/40*  (2011.01)
  *G06T 19/00*  (2011.01)

(56) References Cited

FOREIGN PATENT DOCUMENTS

| CN | 114862992 A | 8/2022 |
|---|---|---|
| CN | 115841534 A | 3/2023 |
| CN | 116309999 A | 6/2023 |
| WO | WO2021140433 A2 | 7/2021 |

OTHER PUBLICATIONS

Office action and Search Report issued by The China National Intellectual Property Administration (CNIPA) for application CN 202310847425.5 on Aug. 23, 2023.
English translation of the office action and search report issued by The China National Intellectual Property Administration (CNIPA) for application CN 202310847425.5 on Aug. 23, 2023.
Grant Notification issued by the The China National Intellectual Property Administration (CNIPA) for application CN 202310847425.5 Aug. 30, 2023.
English translation of the grant Notification issued by the The China National Intellectual Property Administration (CNIPA) for application CN 202310847425.5 Aug. 30, 2023.

\* cited by examiner

DIGITAL HUMAN DRIVING METHOD AND APPARATUS, AND STORAGE MEDIUM

FIELD

This application relates to the field of computers and image processing and, in particular, to a digital human driving method and apparatus, an electronic device and a storage medium.

BACKGROUND

Digital humans have become an indispensable tool in fields such as gaming, animation and film, and how to drive a digital human efficiently and accurately is a technical problem that has been widely acknowledged.

In related technology, a motion capture device may be used to obtain all movement information of a real human, and the digital human in the virtual space can be directly driven to move based on the movement information of the real human. However, cost and usage complexity of the motion capture device are both extremely high.

In other related technologies, a monocular camera is used to capture video data of a real human, and key point positions of the human body are extracted from the video data to obtain movement information of the key points, so as to drive the digital human through the movement information of the key points. However, this manner only employs a monocular camera and, thus, the captured video data has a single angle of view. In actual application, key points in the blind area of the camera cannot be captured, causing the movement information of the key points in the blind area of the camera to be inconsistent with other key points during the process of driving the digital human, which are visually represented as shaking, malposition of joint rotation, and partial part loss of the digital human.

SUMMARY

A digital human driving method is provided according to embodiments of the present application, to solve the problem of visible shaking, malposition of joint rotation, and partial part loss of the digital human during the process of driving the digital human.

For the above purposes, the present application provides the following technical solutions.

In a first aspect, a digital human driving method is provided, including: capturing video data from a plurality of angles of view in a real three-dimensional space by a plurality of video capture devices, wherein the video data includes a target human; determining a first coordinate of a key point of the target human, where the first coordinate is a two-dimensional coordinate of the key point in a video frame of the video data; determining a mapping relationship based on the first coordinate, where the mapping relationship is a correspondence between the key point and a virtual key point in a virtual three-dimensional space; calculating a second coordinate based on the mapping relationship and the first coordinate, where the second coordinate is a three-dimensional coordinate of the virtual key point in the virtual three-dimensional space; processing the second coordinate according to a key point rotation model to obtain a rotation value of the virtual key point in the virtual three-dimensional space; and driving a digital human to move based on the rotation value of the virtual key point in the virtual three-dimensional space.

In conjunction with the first aspect, in another possible implementation, after capturing the video data from the plurality of angles of view in the real three-dimensional space by the plurality of video capture devices, the method further includes: detecting the target human in the video data; determining the key point of the target human in case that the target human is detected; and maintaining the digital human in a standby pose in case that no target human is detected.

In conjunction with the first aspect, in another possible implementation, determining the mapping relationship based on the first coordinate includes: determining a first parameter matrix based on the first coordinate of the key point, where the first parameter matrix indicates a transformation relationship of transforming a position point in the real three-dimensional space from a first coordinate system to a second coordinate system, the first coordinate system is a three-dimensional coordinate system in the real three-dimensional space with a center of the target human as an origin, and the second coordinate system is a three-dimensional coordinate system in the real three-dimensional space with an optical center of the video capture device as an origin; obtaining a second parameter matrix, where the second parameter matrix indicates a transformation relationship of transforming a position point in the real three-dimensional space from the second coordinate system to a third coordinate system, and the third coordinate system is a coordinate system with an image center of the video frame of the video data as an origin; and taking a matrix of a product of the first parameter matrix and the second parameter matrix as the mapping relationship.

In conjunction with the first aspect, in another possible implementation, determining the first parameter matrix based on the first coordinate of the key point includes: determining an initial first parameter matrix based on the first coordinate of the key point; obtaining a third coordinate of the key point, where the third coordinate is a three-dimensional coordinate of the key point in the real three-dimensional space; calculating a first predicted coordinate value based on the third coordinate and the initial first parameter matrix; determining a first loss value based on the first predicted coordinate value and the first coordinate; and iteratively updating the initial first parameter matrix based on the first loss value until the first loss value is less than a first preset threshold, and determining the newly updated initial first parameter matrix as the first parameter matrix.

In conjunction with the first aspect, in another possible implementation, before processing the second coordinate according to the key point rotation model to obtain the rotation value of the virtual key point in the virtual three-dimensional space, the method includes: obtaining at least one set of sample data, wherein the sample data includes a sample coordinate and a sample rotation value of a key point of a sample human in a sample video, and the sample coordinate is a two-dimensional coordinate of the key point of the sample human in a video frame of the sample video; processing the sample coordinate of the key point of the sample human according to an initial key point rotation model to obtain a predicted rotation value; determining a second loss value based on the predicted rotation value and the sample rotation value; iteratively updating the initial key point rotation model based on the second loss value until the second loss value is less than a second preset threshold, and determining the newly updated initial key point rotation model as the key point rotation model.

In conjunction with the first aspect, in another possible implementation, data formats of the sample coordinate and the sample rotation value of the key point of the sample human are quaternion formats.

In conjunction with the first aspect, in another possible implementation, after processing the second coordinate according to the key point rotation model to obtain the rotation value of the virtual key point in the virtual three-dimensional space and before driving the digital human to move based on the rotation value of the virtual key point in the virtual three-dimensional space, the method includes: performing a smoothing process on the rotation value of the virtual key point in the virtual three-dimensional space.

In a second aspect, a digital human driving device is provided. The digital human driving device has functions of implementing the methods according to the first aspect. The functions can be implemented by hardware, or software executed by hardware. The hardware or software includes one or more modules corresponding to the above functions.

In a third aspect, a digital human driving apparatus is provided, including: a video capture module, configured to capture video data from a plurality of angles of view in a real three-dimensional space by a plurality of video capture devices, wherein the video data comprises a target human; a first coordinate determination module, configured to determine a first coordinate of a key point of the target human in the video data captured by the video capture module, wherein the first coordinate is a two-dimensional coordinate of the key point in a video frame of the video data; a mapping relationship determination module, configured to determine a mapping relationship based on the first coordinate determined by the first coordinate determination module, wherein the mapping relationship is a correspondence between the key point and a virtual key point in a virtual three-dimensional space; a second coordinate calculation module, configured to calculate a second coordinate based on the mapping relationship determined by the mapping relationship determination module and the first coordinate determined by the first coordinate determination module, wherein the second coordinate is a three-dimensional coordinate of the virtual key point in the virtual three-dimensional space; a second coordinate process module, configured to process the second coordinate obtained by the second coordinate calculation module according to a key point rotation model to obtain a rotation value of the virtual key point in the virtual three-dimensional space; and a digital human driving module, configured to drive the digital human to move based on the rotation value of the virtual key point in the virtual three-dimensional space obtained by the second coordinate process module.

In a fourth aspect, a digital human driving device is provided, including a processor and a memory storing computer-executable instructions, and the processor being configured to, when the digital human driving device operates, execute the computer-executable instructions stored in the memory to enable the digital human driving device to perform the digital human driving method provided according to any of the implementations in the first aspect.

In a fifth aspect, a computer-readable storage medium is provided. The computer-readable storage medium stores instructions, and when the instructions are executed by a computer, the computer is able to perform the digital human driving method provided according to any of the implementations in the first aspect.

In a sixth aspect, a computer program product including instructions is provided. The computer program product, when being executed on a digital human driving device, enables the digital human driving device to perform the digital human driving method provided according to any of the implementations in the first aspect.

In a seventh aspect, an apparatus (for example, a chip system) is provided. The apparatus includes a processor configured to support a digital human driving device to implement the functions involved in the first aspect. In a possible implementation, the apparatus also includes a memory configured to store program instructions and data necessary for the digital human driving device. If the apparatus is a chip system, it may be composed of a chip, or may include a chip and other discrete devices.

Based on the technical solutions provided according to the embodiments of the present application, multiple video capture devices are used to capture video data of a target human from multiple angles of view in a real three-dimensional space, so as to solve the problem of visible shaking, malposition of joint rotation, and partial part loss of the digital human during the process of driving the digital human due to some key points of the target human not being detected in the case of single angle of view of the video data. In addition, the first coordinate of the key point of the target human is determined, and a mapping relationship is determined based on the first coordinate, wherein the mapping relationship is a correspondence between the key point and a virtual key point in a virtual three-dimensional space, that is, the process of determining the mapping relationship is the process of position calibration of the video capture device, therefore with the technical solution, calibration is completed based on the first coordinate of the key point of the target human in the video data from multiple angles of view without a calibration plate, and thus laying cost of the calibration plate is saved. Finally, the second coordinate is calculated based on the mapping relationship and the first coordinate, and the second coordinate is processed according to a key point rotation model, to obtain a rotation value of the virtual key point in the virtual three-dimensional space, and the digital human is driven to move based on the rotation value of the virtual key point in the virtual three-dimensional space, in this way, the rotation values of all the key points can be obtained simultaneously by processing the second coordinates according to the key point rotation model, thereby improving efficiency of driving the digital human.

To sum up, on the one hand, with the technical solution provided according to the present application, the problem of visible shaking, malposition of joint rotation, and partial part loss of the digital human during the process of driving the digital human due to some key points of the target human not being detected in the case of single angle of view of the video data can be solved. On the other hand, with the technical solution provided according to the present application, calibration can be completed based on the first coordinate of the key point of the target human in the video data from multiple angles of view without a calibration plate, and thus laying cost of the calibration plate is saved. Finally, with the technical solution provided according to the present application, efficiency of driving the digital human is improved.

DETAILED DESCRIPTION OF THE EMBODIMENTS

Figure 1:
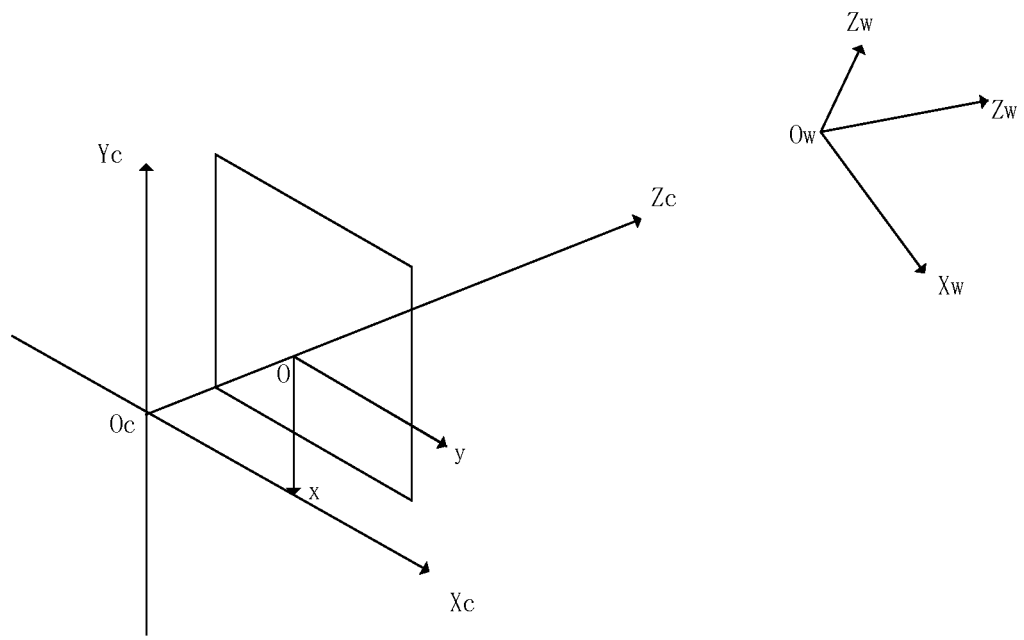
FIG. 1 is a schematic diagram of position relationships among a world coordinate system, a camera coordinate system and an image coordinate system.

In order to make the purposes and embodiments of this application clearer, exemplary embodiments of this application will be described clearly and completely in combination with drawings in the embodiments of this application. Of course, the embodiments as described are only parts of the embodiments of this application, rather than all of them.

It should be noted that brief description of terms in this application is intended only to facilitate understanding of the embodiments described below and is not intended to limit the embodiments of this application. Unless otherwise stated, these terms should be understood in their ordinary and usual meaning.

The terms "first", "second", "third", etc. referred to in the specification, drawings and claims of this application are used to distinguish similar objects or similar entities and are not necessarily meant to define a particular order or sequence, unless otherwise indicated. It should be understood that the terms used in this way are interchangeable where appropriate.

The terms "include" and "have" and any variations thereof in this application are intended to cover but not to exclude. For example, a product or an equipment including a set of components should not be limited to the components clearly listed, but may include other components not clearly listed or other components inherent to the product or device.

The term "and/or" used in this application is only to describe association relationship of the associated objects, and it indicates that there may be three relationships. For example, A and/or B may indicate three relationships: A alone, both A and B, and B alone. In addition, the character "/" in this application generally indicates an "or" relationship between the associated objects before and after the character "/".

The flowcharts and block diagrams in the drawings illustrate possible architecture, functions and operations of systems, methods and computer program products according to various embodiments of this application. At this point, each block in a flowchart or a block diagram may represent a module, a program segment, or part of codes that contain one or more executable instructions for implementing a specified logical function. It should also be noted that in some alternative implementations, the function indicated in the block may be performed in a different order than that indicated in the drawings. For example, two blocks that are represented consecutively may be executed in parallel, and sometimes can be executed in a reverse order, depending on the related functions. It is also noted that each block in a block diagram or flowchart, and combination of blocks in a block diagram or flowchart, may be implemented by a dedicated hardware-based system that performs a specified function or operation, or by a combination of dedicated hardware and computer instructions.

Based on the embodiments described in this application, all other embodiments that can be obtained by those skilled in the art without creative labor are within the protection scope of the claims of this application. In addition, although this application is described in terms of one or more exemplary embodiments, it is understood that each aspect of this application may individually constitute a complete embodiment. It should be noted that brief description of terms in this application is intended only to facilitate understanding of the embodiments described below and is not intended to limit the embodiments of this application. Unless otherwise stated, these terms should be understood in their ordinary and usual meanings.

First of all, terms involved in this application are explained below.

Key point, refers to a specific point on a human body, usually expressed as a coordinate in a two-dimensional image or in a three-dimensional space. The key point may include a facial key point such as a specific part of eyes, nose, mouth and other facial features; a body pose key point of a part of the body such as the neck, shoulders, elbows, wrists, waist, knees and ankles; a hand key point of a part of a hand such as the fingers, palms and wrists. The key points mentioned in the following embodiments usually refer to body pose key points, unless otherwise specified.

Multi-lens camera, refers to a camera with more than one lens.

Camera calibration, refers to a process of determining intrinsic parameters and extrinsic parameters of the camera. Image coordinates may be mapped to a three-dimensional world coordinate system through the camera calibration.

World coordinate system, refers to a three-dimensional rectangular coordinate system that can be used as reference to describe a relative spatial position between the camera and the object to be measured. As shown in FIG. 1, the world coordinate system $O_W\text{-}X_W Y_W Z_W$ generally takes the center of the object to be measured as an origin. The world coordinate system may be freely determined based on actual situation. After a world coordinate system is determined, position and angle of the world coordinate system cannot be changed in the subsequent process.

Camera coordinate system, refers to a three-dimensional rectangular coordinate system that can be used as reference to describe a relative spatial position between the camera and the object to be measured. As shown in FIG. 1, the camera coordinate system $O_C$-$X_C Y_C Z_C$ generally takes the optical center of the camera lens as an origin. Position and angle of the camera coordinate system change with position and pose of the camera lens.

Image coordinate system, refers to a two-dimensional rectangular coordinate system. As shown in FIG. 1, the image coordinate system O-XY generally takes the intersection point of the optical axis and the image plane as an origin, that is, takes the center point of the image as an origin, and X-axis and Y-axis are parallel to the two sides of the image plane, respectively.

Inverse Kinematics (IK), refers to a physical motion mode of calculating displacement and movement direction of a parent joint and passing the obtained information to a child joint. That is, a lower bone in a skeletal chain is positioned to cause a higher bone to rotate, and thus a joint pose is set, and the rotation of each parent joint may be calculated based on the position movement of the end child joint.

Forward Kinematics (FK), refers to a physical motion mode of achieving movement by the parent joint driving the child joint, that is, the position of each child joint is calculated based on the rotation of the parent joint.

Inverse Kinematics network (IKNet), refers to a network with the position of the child joint as an input and the rotation of the parent joint as an output.

Savitzky-Golay (Savgol) algorithm, refers to a data smoothing algorithm commonly used in digital signal processing. Specifically, Savgol algorithm may perform a polynomial fit on original data and smooth the fitted curve, thus eliminating noise and oscillation in the original data.

High-Resolution Net (HRNet), refers to a deep learning-based neural network model that can be used to process image tasks. Specifically, HRNet uses information of multiple resolutions for feature extraction, and combines the information to generate a more expressive feature representation. Numerous experiments have demonstrated that HRNet achieves the most advanced results in tasks such as key point detection, pose estimation and human body segmentation. In addition, HRNet may also be applied to other image processing tasks that require high-resolution spatial feature details.

Perspective-n-Point (PnP) algorithm, refers to a pose estimation algorithm in computer vision. The PnP algorithm may be used to obtain pose (position and orientation) of the camera and the spatial relationship between the object and the camera based on known coordinates and corresponding pixel points of the object in the three-dimensional space.

Levenberg-Marquardt (LM) algorithm, refers to an optimization algorithm for nonlinear least squares issues. LM algorithm combines advantages of Gauss-Newton method and gradient descent method, and can effectively solve the problem of nonlinear parameter estimation in numerical calculation.

Camera extrinsic parameters, refers to parameters that describe position and orientation of the camera in a three-dimensional space, generally including a rotation matrix and a translation vector of the camera.

Camera intrinsic parameters, refers to intrinsic parameters of the camera used to describe basic configuration and characteristics of the optical system of the camera. Camera intrinsic parameters are generally stored in metadata of the camera and can be accessed and used by applications or computer vision algorithms.

Bundle adjustment (bundle adjust) optimization method, refers to a method that uses the least square method to adjust the camera pose and three-dimensional point cloud coordinates, to cause an error between a point re-projected on the image plane and a corresponding point in the original image to be minimized, so as to obtain more accurate camera pose and three-dimensional point cloud coordinates.

Euclidean distance, also called as Euclid distance, refers to a distance between two points in an n-dimensional space. In general, in an n-dimensional space, the Euclidean distance d between point A (x1, x2, . . . xn) and point B (y1, y2, . . . yn) may be calculated through the following formula:

$$d = \sqrt{\sum_{i=1}^{n}(x_i - y_i)^2}$$

Where xi indicates the coordinate of point A in the i-th dimension of the n-dimensional space, yi indicates the coordinate of point B in the i-th dimension of the n-dimensional space, and d is the Euclidean distance between the two points A and B.

Adaptive Moment Estimation (Adam optimization) algorithm, refers to a commonly used adaptive learning rate optimization method, which may be used for efficiently training a deep neural network. Adam optimization algorithm is an optimization method to adjust the learning rate of each parameter by calculating the first moment (mean value) and second moment (unbiased estimate of variance) of a gradient, combined with an adaptive learning rate way of previous parameter update amount.

With people's growing requirements for digital experiences, the trend to use digital characters (for example, virtual assistants) is also increasing. In this digital age, digital human is always a compelling topic. A digital human may be a virtual character, a humanoid robot or any digital entity with voice, vision, touch and action capabilities. Digital human is widely used in various fields such as healthcare, financial service, industrial automation and customer service.

In the related technology, synchronous movement of the digital human with the real human is realized by capturing movement information of key points of the real human body. Specifically, pose data of the real human body is captured by a monocular camera, then key point detection is performed to determine positions of key points, and then action information of the whole body are obtained through the key points, and finally the digital human is driven in real time based on the action information of the whole body.

However, the above solution only uses a monocular camera, and thus the video data is captured from a single angle of view, and, in actual application, key points located in a blind area of the camera cannot be captured, causing the movement information of the key points in the blind area of the camera to be inconsistent with other key points during the driving process of the digital human, which is visually presented as shaking, malposition of joint rotation, and partial part loss of the digital human. In addition, due to the single angle of view of the monocular camera, in a case that a real human in the three-dimensional space faces away from the lens, the digital human driving device would take the back of the real human as the front side, resulting in the movement direction of the digital human being inconsistent with the movement direction of the real human. Therefore, the real human in the real three-dimensional space must always face towards the lens of the monocular camera, resulting in limited range of activities and limited actions.

If a multi-lens camera is used, labor cost may be greatly increased due to complicated calibration of the multi-lens camera. In addition, calibration of the multi-lens camera needs to lay a calibration plate, which brings unnecessary economic cost.

In other related technologies, a real human within a real three-dimensional space may directly wear a motion capture device, and a digital human driving device may directly drive the digital human to move based on real-time action information obtained by the motion capture device. However, cost and complexity of the motion capture device are high.

In view of above, a digital human driving method is provided according to an embodiment of the present application. Firstly, multiple video capture devices are used to capture video data of a target human from multiple angles of view in a real three-dimensional space, so as to solve the problem of shaking, malposition of joint rotation, and partial part loss of the digital human during the process of driving the digital human due to some key points of the target human not being detected in the case of single angle of view of the video data. Then, a first coordinate of a key point of the target human is determined, and mapping relationship is determined based on the first coordinate, wherein the mapping relationship is correspondence between the key point and a virtual key point in a virtual three-dimensional space, that is, the process of determining the mapping relationship is a process of position calibration of the video capture device. Therefore, according to the technical solution of the present application, calibration is completed based on the first coordinate of the key point of the target human in the video data from multiple angles of view without a calibration plate, and thus laying cost of the calibration plate is saved. Finally, a second coordinate is calculated based on the mapping relationship and the first coordinate, and the second coordinate is processed according to a key point rotation model, to obtain a rotation value of the virtual key point in the virtual three-dimensional space, and the digital human is driven to move based on the rotation value of the virtual key point in the virtual three-dimensional space. In this way, rotation values of all the key points can be obtained simultaneously by processing the second coordinates according to the key point rotation model, thereby improving efficiency of driving the digital human.

Figure 2:
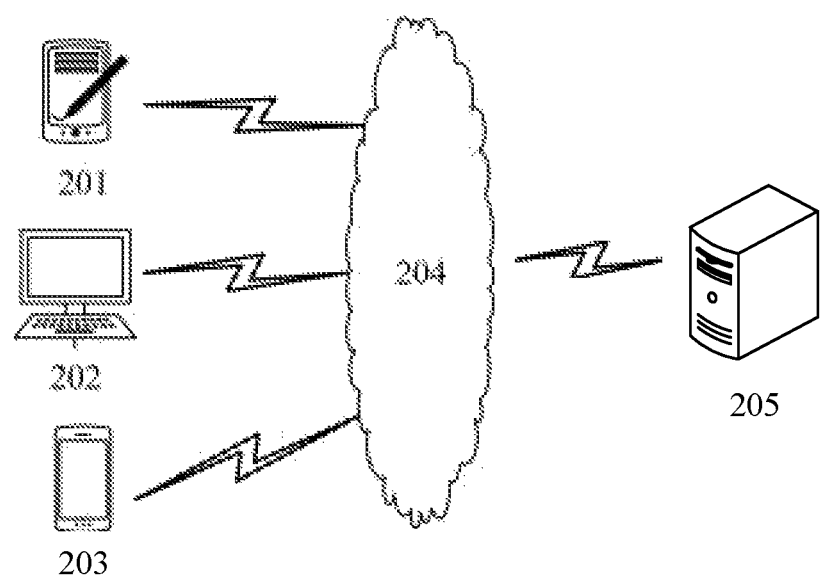
FIG. 2 is a schematic diagram of software architecture of a digital human driving device according to an embodiment of the present application.

FIG. 2 shows a schematic diagram of system architecture of an exemplary application for the digital human driving method and digital human driving device according to an embodiment of the present application.

As shown in FIG. 2, a system architecture 200 used by the technical solution of this application may include at least one terminal devices, an internet 204 and a server 205. In FIG. 2, as an example, the terminal devices include a terminal device 201, a terminal device 202, and a terminal device 203. In practice, the number of the terminal devices may be more or less. Internet 204 provides medium for communication links among the terminal devices 201, 202, 203 and the server 205. Internet 204 may be implemented by various types of connections, such as a wired communication link, a wireless communication link, or a fiber optic cable. The terminal device 201, the terminal device 202 and the terminal device 203 may be any electronic devices with display screens, including, but not limited to, desktop computers, portable computers, smartphones and tablets. It should be understood that the numbers of the terminal devices, the network and the server in FIG. 2 are only exemplary. Depending on actual requirements, there may be any number of terminal devices, networks, and servers. For example, the server 205 may be a server cluster composed of multiple servers.

The digital human driving method provided in the embodiment of the present application may be performed by the server 205. For example, the server 205 may determine a first coordinate of a key point of a target human based on video data captured, by a plurality of video capture devices, from a plurality of angles of view in a real three-dimensional space, determine a mapping relationship based on the first coordinate, calculate a second coordinate based on the mapping relationship and the first coordinate, process the second coordinate according to a key point rotation model to obtain a rotation value of a virtual key point in a virtual three-dimensional space, and drive the digital human to move based on the rotation value of the virtual key point in the virtual three-dimensional space. Alternatively, the digital human driving method provided according to the embodiment of the present application may be performed by the terminal device. Alternatively, the digital human driving method provided according to the embodiment of the present application may be performed jointly by the terminal device and the server 205, which is not limited in the present embodiment.

The video data involved in the present application may be data authorized by the user or fully authorized by individual parties.

The methods described in the following embodiments may be implemented in a digital human driving device with the above described hardware structure and software structure. The digital human driving methods provided according to the embodiments of the present application will be described below.

Figure 3:
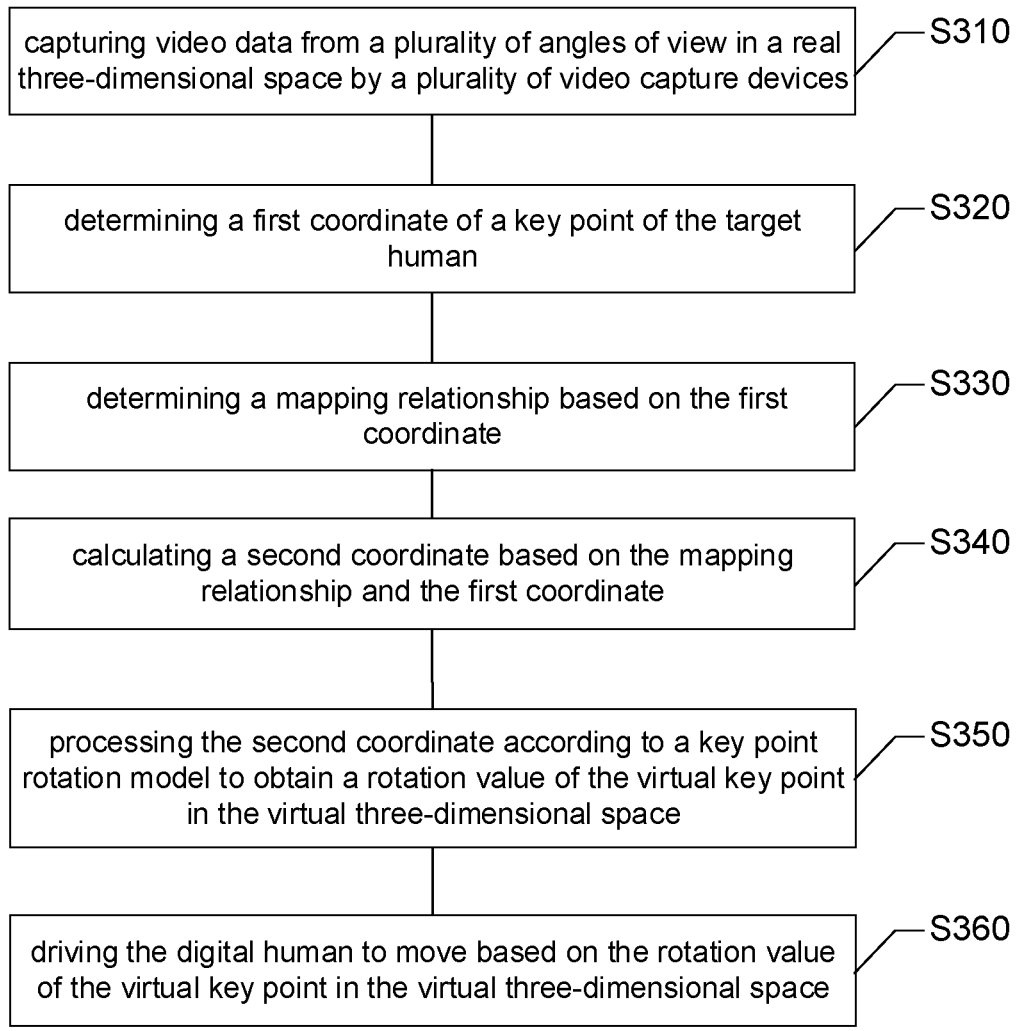
FIG. 3 is a first flowchart of a digital human driving method according to an embodiment of the present application.

As shown in FIG. 3, a digital human driving method is provided according to an embodiment of the present application, which is applied to a digital human driving device capable of receiving video data and processing images. The digital human driving device may be the server 105 or part of the server 105 described in the above embodiment. The method may include steps S310-S360.

Before performing the step S310, the digital human driving device firstly generates a digital human in a virtual three-dimensional space.

S310, capturing video data from a plurality of angles of view in a real three-dimensional space by a plurality of video capture devices.

Wherein, the video data includes a target human, the video capture device may be a monocular camera, and the plurality of video capture devices are multiple monocular cameras.

In some examples, the target human is located in a capturing range within a real three-dimensional space, and the video capture devices may capture video data including the target human in the capturing range from various angles of view.

In some examples, the video capture device may be a multi-lens camera. The type and number of the video capture devices are not limited in the present application only if the video data including the target human can be captured from various angles of view.

Figure 4:
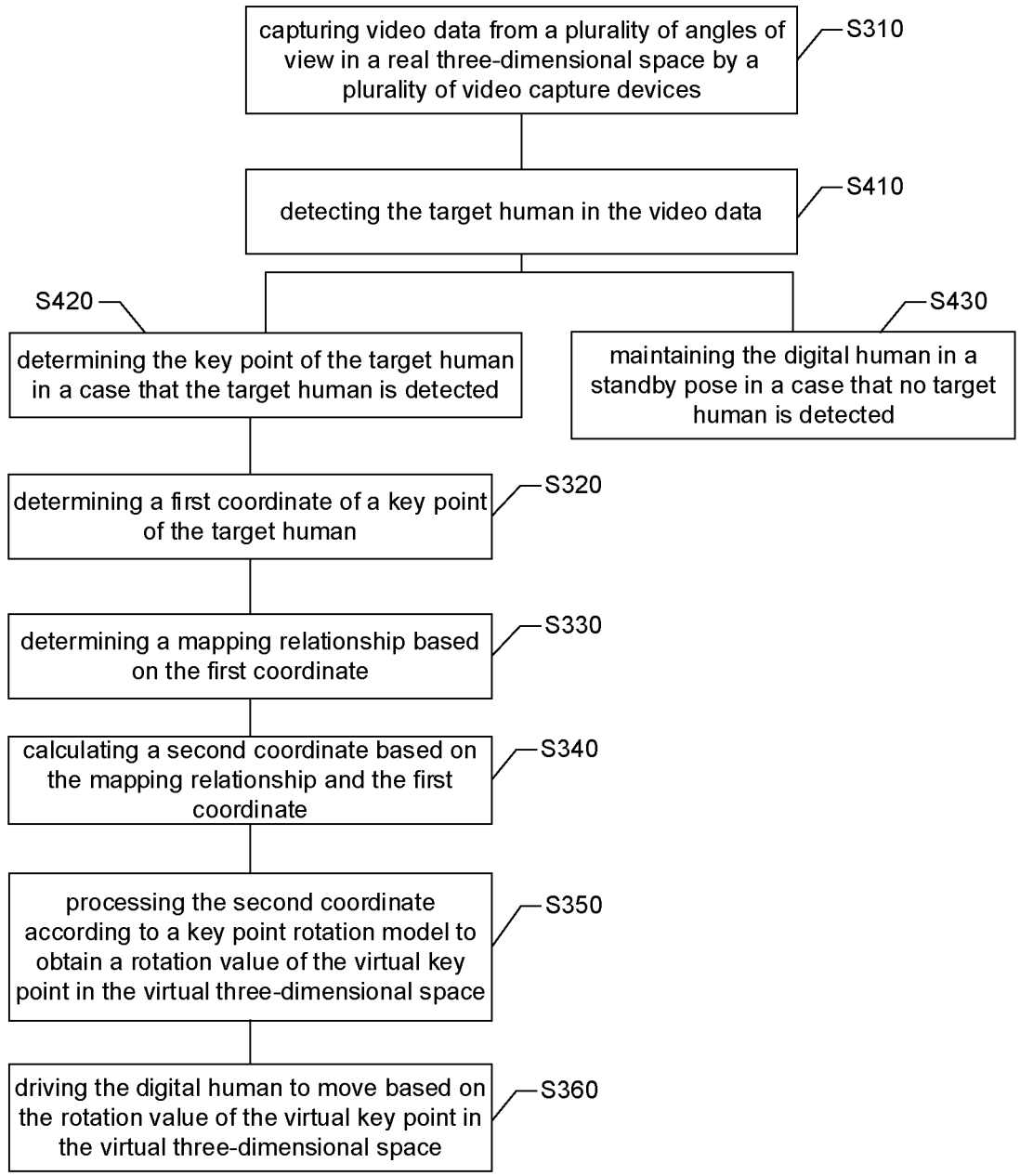
FIG. 4 is a second flowchart of a digital human driving method according to an embodiment of the present application.

In some examples, after the video capture device starts to capture the video data, the target human may move out of the capturing range of the video capture device during movement, or the target human has not entered the capturing range after the video capture device starts to capture the video data. In this case, pose and position of the digital human needs to be initialized. Based on this, with reference to FIGS. 3 and 4, steps S410 to S430 are performed after S310.

S410, detecting the target human in the video data.

In some examples, the digital human driving device may obtain the video data captured by the video capture devices through network transmission or USB transmission. The video data may have color, have a video resolution of 720 P, 1080 P, 2 K or 4 K, have a video frame rate of 30 frames, an audio bit rate of 128 kb/s, an audio sampling rate of 44100 Hz, and so on.

In some examples, the digital human driving device, after obtaining the video data captured by the video capture device, detects whether the target human exists in the video data using an image segmentation method. Specifically, firstly, the digital human driving device obtains an image of a video frame of the video data based on the video data captured by the video capture device, as an original image, and converts the original image into a black-and-white grayscale image, so as to more easily separate a target human and the background in the original image; the digital human driving device then identifies edge features of the black-and-white grayscale image using an edge detection algorithm; and then the digital human driving device binarizes the edge features to get a binary image; the digital human driving device then extracts a contour of the target human and other contours from the binary image using a contour find algorithm; and lastly, the digital human driving device filter out other contours to get the contour of the target human.

S420, determining key point(s) of the target human in case a target human is detected.

In some examples, once the digital human driving device detects that there is a target human in the video data, it uses HRNet to detect key points of the target human. The key points are some major joint parts of the target human, for example, the key points may include 21 key points in the neck, the shoulders, the elbows, the wrists, the waist, the knees, the ankles and the like. The process of detecting the key points of the target human using the HRNet includes: firstly, inputting the image of the video frame of the video data in which the target human is detected into the HRNet for feature extraction, to obtain feature maps with different resolutions and scales in different feature layers; then forming a pyramid using the feature maps extracted from the multiple feature layers and the original image, to obtain comprehensive, representative and diverse feature maps through interaction and information sharing among the feature maps with various scales; then outputting probability matrixes of key point coordinates for each feature map with the extracted feature maps; and finally outputting predicted key point coordinates to the original image of the video frame of the video data. The connection relationships between the key points may be represented by lines or circles.

It is understandable that other key point detection algorithms in addition to the HRNet may be alternatively used for the digital human driving device to detect the key points of the target human, such as an affinity field (OpenPose) algorithm, a fast human pose estimation (FastPose) algorithm of the key points, and the like. This application does not intend to limit the algorithm for detecting the key points of the target human used by the digital human driving device.

S430, maintaining the digital human in a standby pose in a case that no target human is detected.

In some instances, if the digital human driving device doesn't detect any target human, that is, it doesn't detect key point positions or subsequent key point movement information of a target human, it needs to initialize pose of the digital human to a standby pose, such as a pose of standing vertically.

It is understandable that the standby pose may be poses other than standing vertically, and a user can customize the standby pose according to actual needs. This application does not make restrictions on the standby pose.

In the above technical solution based on steps S410 to S430, the digital human driving device, after generating the digital human in the virtual three-dimensional space, obtains video data captured by the video capture device and detects whether there is a target human in the video data. If a target human is detected, the digital human driving device continues to detect key point positions of the target human. If no target human is detected, the digital human driving device keeps the digital human in the virtual three-dimensional space in a standby pose, thereby avoiding shaking of the digital human due to not receiving action information and being interfered by other factors when the digital human driving device doesn't detect a target human. Therefore, this technical solution allows improving pose stability of the digital human.

S320, determining a first coordinate of each key point of the target human.

The first coordinate is a two-dimensional coordinate of a key point in a video frame of the video data. Specifically, the first coordinate may be a two-dimensional coordinate of the key point in an image coordinate system.

In some instances, the image coordinate system is determined, with an image center of the video frame in the video data as an origin, the right side of the x axis is taken as the positive direction of the x axis, and the downward side of the y axis is taken as the positive direction of the y axis, and the coordinate of each key point in the image coordinate system is determined as the first coordinate.

S330, determining a mapping relationship based on the first coordinate.

The mapping relationship indicates a correspondence between the first coordinate of the key point and a three-dimensional coordinate of a virtual key point in a virtual three-dimensional space. Virtual key points of the digital human in the virtual three-dimensional space correspond to the key points of the target human in the real three-dimensional space one to one. For example, there is a key point in the waist of the target human in the real three-dimensional space, and then there is a virtual key point in the waist of the digital human in the corresponding virtual three-dimensional space.

In some examples, for example, the video capture device is a camera, the mapping relationship may be determined via extrinsic parameter and intrinsic parameter of the camera. Specifically, since the extrinsic parameter and intrinsic parameter of the camera are used to indicate correspondence between a first coordinate of a key point and a three-dimensional coordinate of the key point in the real three-dimensional space, if the correspondence is applied to a virtual three-dimensional space, it can be obtained that the extrinsic parameter and intrinsic parameter of the camera are used to indicate a correspondence between the first coordinate of the key point and a three-dimensional coordinate of a virtual key point in a virtual three-dimensional space, that is, at this time, this mapping relationship may be determined through the extrinsic parameter and intrinsic parameter of the camera. In this case, the process of determining the mapping relationship is a process of camera calibration. Based on this, with reference to FIGS. 3 and 4, the step S330 includes steps S510 to S530.

S510, determining a first parameter matrix based on first coordinates of the key points.

The first parameter matrix indicates a transformation relationship for transforming a position point in the real three-dimensional space from a first coordinate system to a second coordinate system. The first coordinate system is a three-dimensional coordinate system in the real three-dimensional space with a center of the target human as an origin, that is, a world coordinate system. The second coordinate system is a three-dimensional coordinate system in the real three-dimensional space with an optical center of the video capture device as an origin, that is, a camera coordinate system.

In some examples, for example, the video capture device is a camera, the first coordinates includes first coordinates of key points at four positions, that is, at the head, the spine and the feet, and the process of determining the mapping relationship is a process of camera calibration. Three-dimensional coordinates of the head, the spine and the feet of the target human in the real three-dimensional space are obtained, and rotation and translation vectors of the camera in the world coordinate system are obtained based on first coordinates of the four key points and three-dimensional coordinates of the four key points in the real three-dimensional space using the LM algorithm, wherein the rotation and translation vectors of the camera are extrinsic parameters of the camera, which are used as the first parameter matrix.

Figure 5:
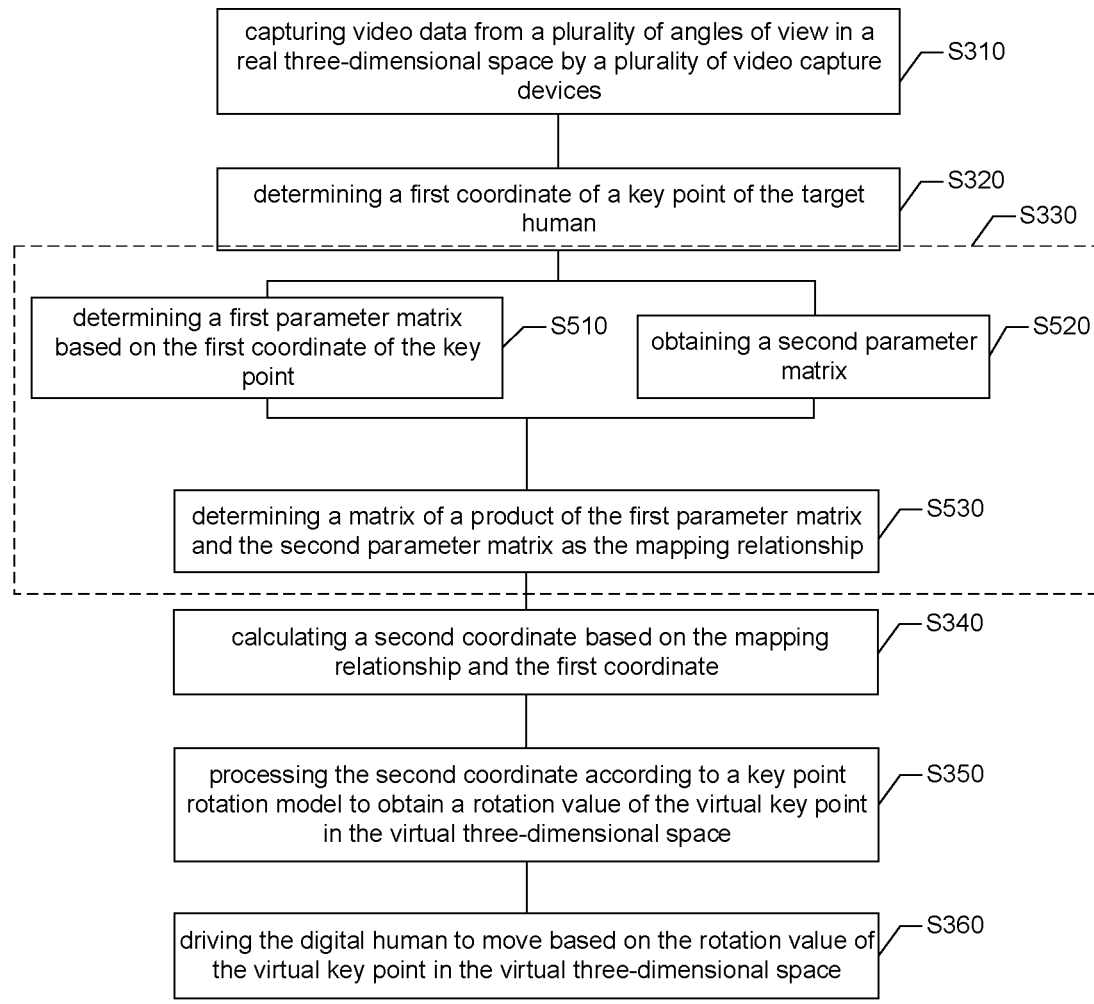
FIG. 5 is a third flowchart of a digital human driving method according to an embodiment of the present application.
Figure 6:
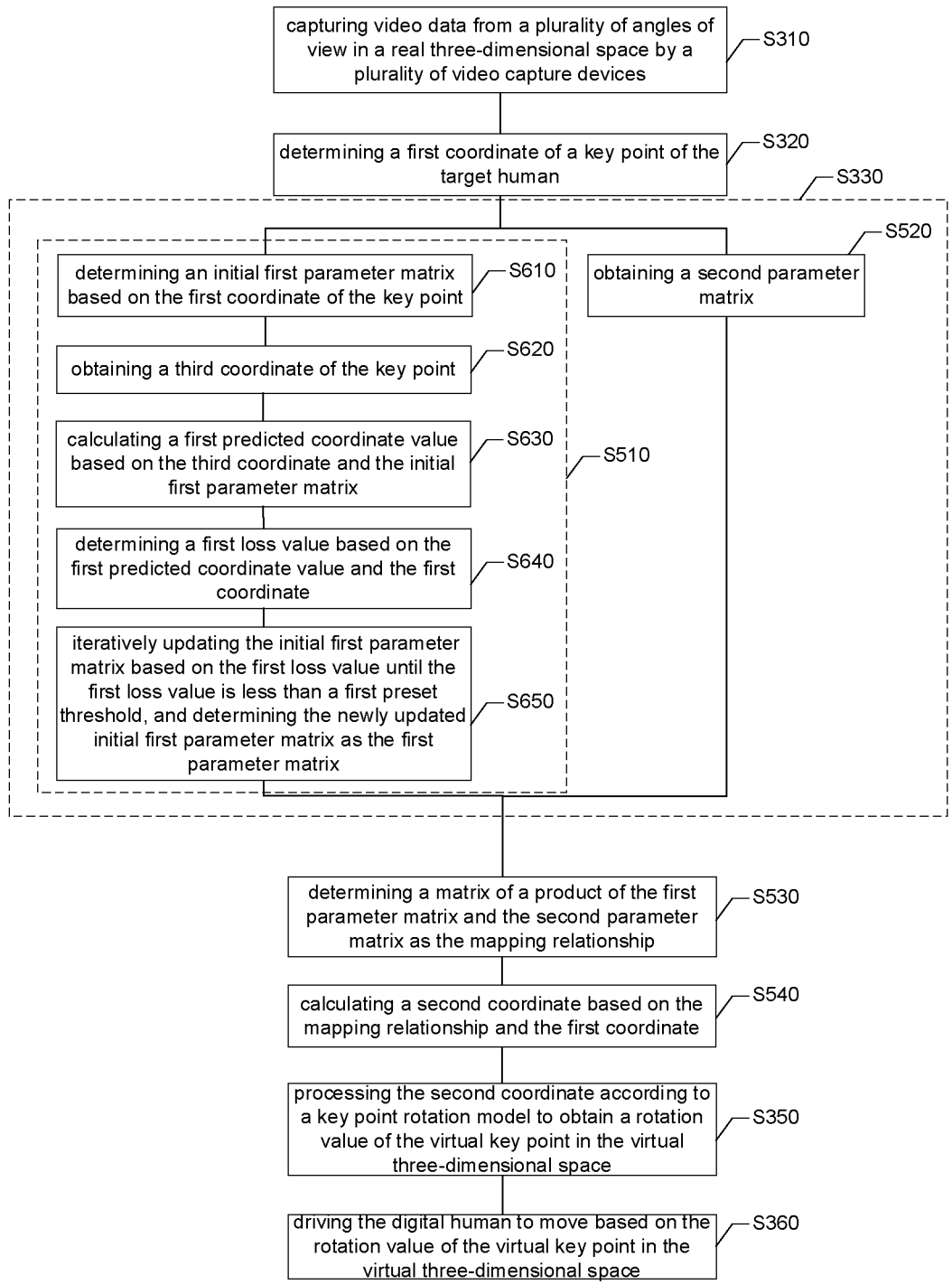
FIG. 6 is a fourth flowchart of a digital human driving method according to an embodiment of the present application.

The process of determining the first parameter matrix in step S510 only relates to four key points at the head, the spine and the feet, while the digital human driving device can determine 21 key points through HRNet in step S420, it therefore can be seen that the key points involved in step S510 are not comprehensive enough, which may lead to an inaccurate first parameter matrix. In this regard, with reference to FIGS. 5 and 6, in order to obtain an accurate first parameter matrix, the step S510 may include steps S610 to S650.

S610, determining an initial first parameter matrix based on the first coordinates of the key points.

In some examples, the first parameter matrix determined based on the first coordinates of the key points at the four positions of the head, the spine, and the feet in step S510 may be taken as an initial first parameter matrix, which needs further optimization because the involved key points are not comprehensive enough.

S620, obtaining a third coordinate of each key point.

The third coordinate is a three-dimensional coordinate of the key point in the real three-dimensional space.

In some examples, a world coordinate system is established with a center of the target human located in the real three-dimensional space as an origin. A three-dimensional coordinate of each key point of the target human in the world coordinate system is determined as the third coordinate.

S630, calculating a first predicted coordinate value based on the third coordinate and the initial first parameter matrix.

In some examples, a case in which the first parameter matrix is the extrinsic parameter of the camera, the initial first parameter matrix is the initial extrinsic parameter of the camera, and the third coordinate is the three-dimensional coordinate of the key point in the real three-dimensional space is taken as an example. Since the initial extrinsic parameter of the camera indicate transformation relationship of position point in the real three-dimensional space from the world coordinate system to the camera coordinate system, the digital human driving device may first obtain the intrinsic parameter of the camera and a distortion parameter, and then calculate the first predicted coordinate value of the key point based on the extrinsic parameter of the camera, the distortion parameter, the intrinsic parameter of the camera, and the third coordinate. Reference may be made to the following formula for a specific calculation:

$$\begin{bmatrix} u \\ v \\ 1 \end{bmatrix} = A \prod {}^c T_w \begin{bmatrix} X^w \\ Y^w \\ Z^w \\ 1 \end{bmatrix}$$

Where u and v are the first predicted coordinate values, A is an intrinsic parameter matrix of the camera, Π is a distortion parameter matrix, Tw is an extrinsic parameter matrix of the camera, and $X^W$, $Y^W$ and $Z^W$ are the coordinate values of the third coordinate.

S640, determining a first loss value based on the first predicted coordinate value and the first coordinate.

In some examples, an Euclidean distance between the first predicted coordinate value and the first coordinate is calculated, which is used as a first loss value.

S650, iteratively updating the initial first parameter matrix based on the first loss value until the first loss value is less than a first preset threshold, and determining a newly updated initial first parameter matrix as the first parameter matrix.

In some examples, for example, a duration of the video data is 3 seconds and a frame rate thereof is 30 frames, the number of the key points is 21, and the first preset threshold is 20 mm. The digital human driving device can obtain 3×30×21=1890 sets of key point coordinate groups. A bundle adjust algorithm is used to iteratively update the initial first parameter matrix with the first loss value. An optimization function of the bundle adjust is as follows:

$$\min \sum_{i=1}^{n} \sum_{j=1}^{m} (u_{ij} - \pi(C_j, X_i))^2$$

Where u is the first coordinate of the key point, C is the extrinsic parameter of the camera, and X is the third coordinate in the world coordinate system. The optimization direction is to minimize the optimization function, that is, to minimize the error between the 2D key point in the image coordinate system and the 3D coordinate in the world coordinate system through reprojection transformation of the extrinsic parameter. After N rounds of optimization, a 3D coordinate corresponding to the 2D key point of a single frame image is calculated using the extrinsic parameter of the camera. The 3D coordinate is reprojected, and the Euclidean distance between the reprojected 3D coordinate and the 2D key point is calculated. The optimization is considered to be completed in case that the Euclidean distance is less than 20 mm. An initial first parameter matrix after the optimization is taken as the first parameter matrix.

In the above technical solution provided according to steps S610 to S650, an initial first parameter matrix is determined based on the first coordinate of the key point, a third coordinate of the key point is obtained, a first predicted coordinate value is calculated based on the third coordinate and the initial first parameter matrix, a first loss value is determined based on the first predicted coordinate value and the first coordinate, the initial first parameter matrix is iteratively updated based on the first loss value until the first loss value is less than a first preset threshold, and a newly updated initial first parameter matrix is taken as the first parameter matrix. As can be seen, this technical solution allows the first parameter matrix to be more accurate with several iterations of the initial first parameter matrix, thereby solving the problem of low accuracy of the initial first parameter matrix due to incomplete key points.

S520, obtaining a second parameter matrix.

The second parameter matrix indicates a transformation relationship for transforming a position point in the real three-dimensional space from the second coordinate system to a third coordinate system. The third coordinate system is a coordinate system with an image center of the video frame of the video data as an origin.

In some examples, the second parameter matrix includes a distortion parameter matrix and an intrinsic parameter matrix of the video capture device. The digital human driving device may obtain the distortion parameter matrix and the intrinsic parameter matrix of the video capture device in a wired or wireless manner, and take the intrinsic parameter matrix and distortion parameter matrix as the second parameter matrix.

It is understood that there is no logical sequence between step S510 and step S520. The digital human driving device may firstly execute step S510 and then step S520, or firstly execute step S520 and then step S510, or execute steps S510 and S520 at the same time. The embodiments of this application do not intend to make restrictions on the execution sequence of steps S510 and S520.

S530, taking a product matrix (that is, a matrix of a product) of the first parameter matrix and the second parameter matrix as the mapping relationship.

In the above technical solution provided according to steps S510 to S530, a first parameter matrix, that is, an extrinsic parameter matrix, is determined based on the first coordinate of the key point; a second parameter matrix is obtained; then a product matrix of the first parameter matrix and the second parameter matrix is taken as the mapping relationship. In this way, this technical solution allows calibration to be completed through the first coordinate of the key point without a calibration plate, thereby reducing laying cost of a calibration plate.

S340, calculating a second coordinate based on the mapping relationship and the first coordinate.

The second coordinate is a three-dimensional coordinate of the virtual key point in the virtual three-dimensional space.

In some examples, the second coordinate is calculated based on the mapping relationship and the first coordinate according to the following formula:

$$\begin{bmatrix} u \\ v \\ 1 \end{bmatrix} = T \begin{bmatrix} X^V \\ Y^V \\ Z^V \\ 1 \end{bmatrix}$$

Wherein u and v are the coordinate values of the first coordinate, T is the mapping relationship matrix, and $X^V$, $Y^V$ and $Z^V$ are the coordinate values of the second coordinate.

S350, processing the second coordinate according to a key point rotation model to obtain a rotation value of the virtual key point in the virtual three-dimensional space.

In some examples, the second coordinate is processed using a trained key point rotation model, to obtain rotation value of the virtual key point in the virtual three-dimensional space. The key point rotation model may be a kind of IKNet. The specific process may include: determining a hierarchy of all key points, moving key point of the most child level to the position of the second coordinate of the key point of the most child level, and similarly, moving all key points to positions of second coordinates of these key points in an order from a low level to a high level of the hierarchy, and calculating rotation values of all the key points relative to initial states.

Figure 7:
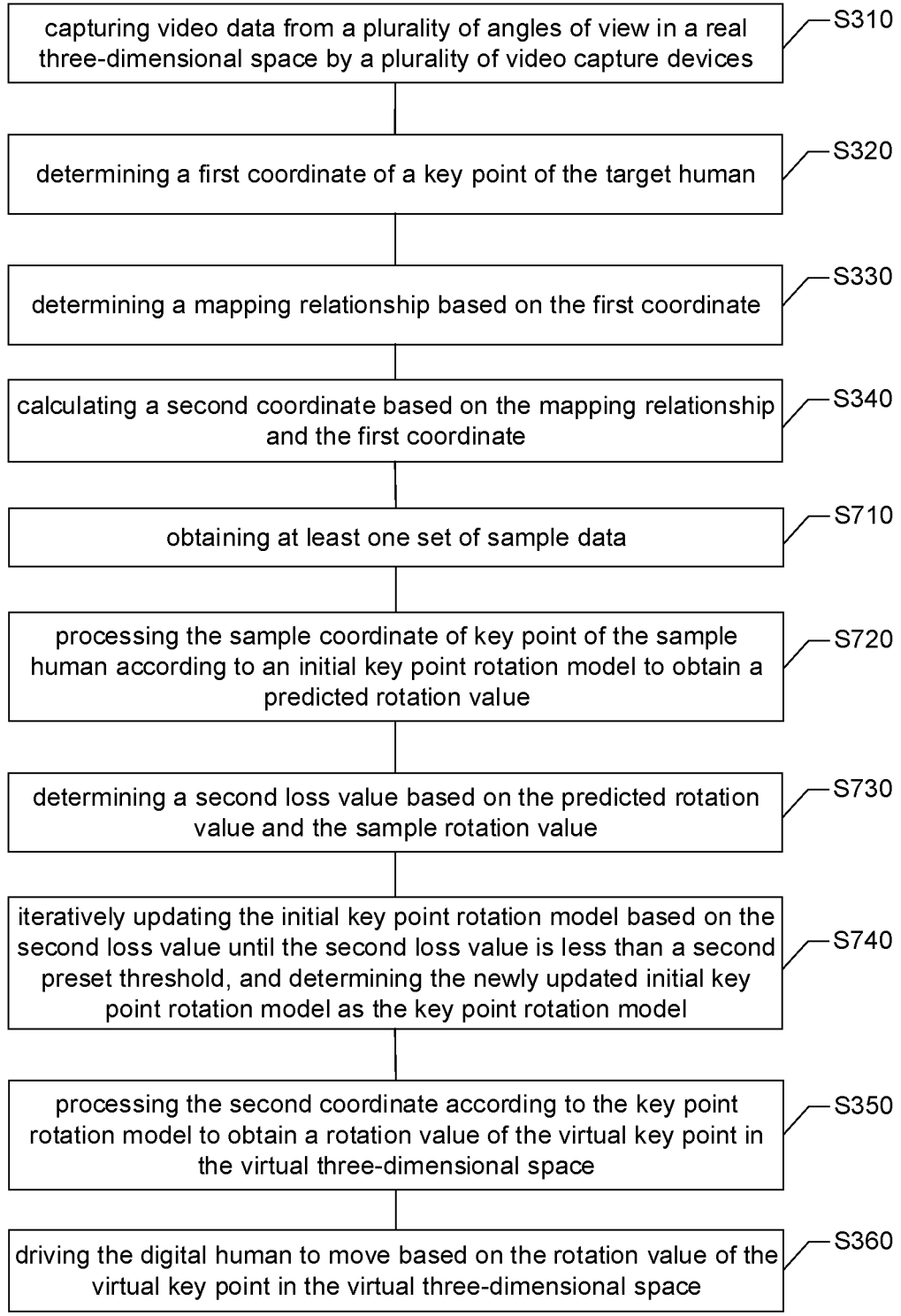
FIG. 7 is a fifth flowchart of a digital human driving method according to an embodiment of the present application.

With reference to FIGS. 3 and 7, the digital human driving device executes steps S710 to S740 before performing step S350.

S710, obtaining at least one set of sample data.

A sample coordinate is a two-dimensional coordinate of a key point of a sample human in a video frame of a sample video.

In some examples, a sample image coordinate system is determined. For example, an image center of the video frame of the sample video data is taken as an origin, the right side of the x axis is taken as the positive direction of the x axis, and the downward side of the y axis is taken as the positive direction of the y axis, thereby obtaining a sample image coordinate system. Coordinate of each key point of the sample human in the sample image coordinate system is determined as the sample coordinate.

S720, processing sample coordinate of the key point of the sample human according to an initial key point rotation model to obtain a predicted rotation value.

In some examples, the initial key point rotation model may be a kind of IKNet. The specific process may include: determining a hierarchy of all sample key points, moving the sample key point of the most child level to the position of sample coordinate of the sample key point of the most child level, and similarly, moving all sample key points to the positions of sample coordinates of the sample key points in an order from a low level to a high level of the hierarchy, and calculating the predicted rotation values of all the sample key points relative to the initial states.

Figure 8:
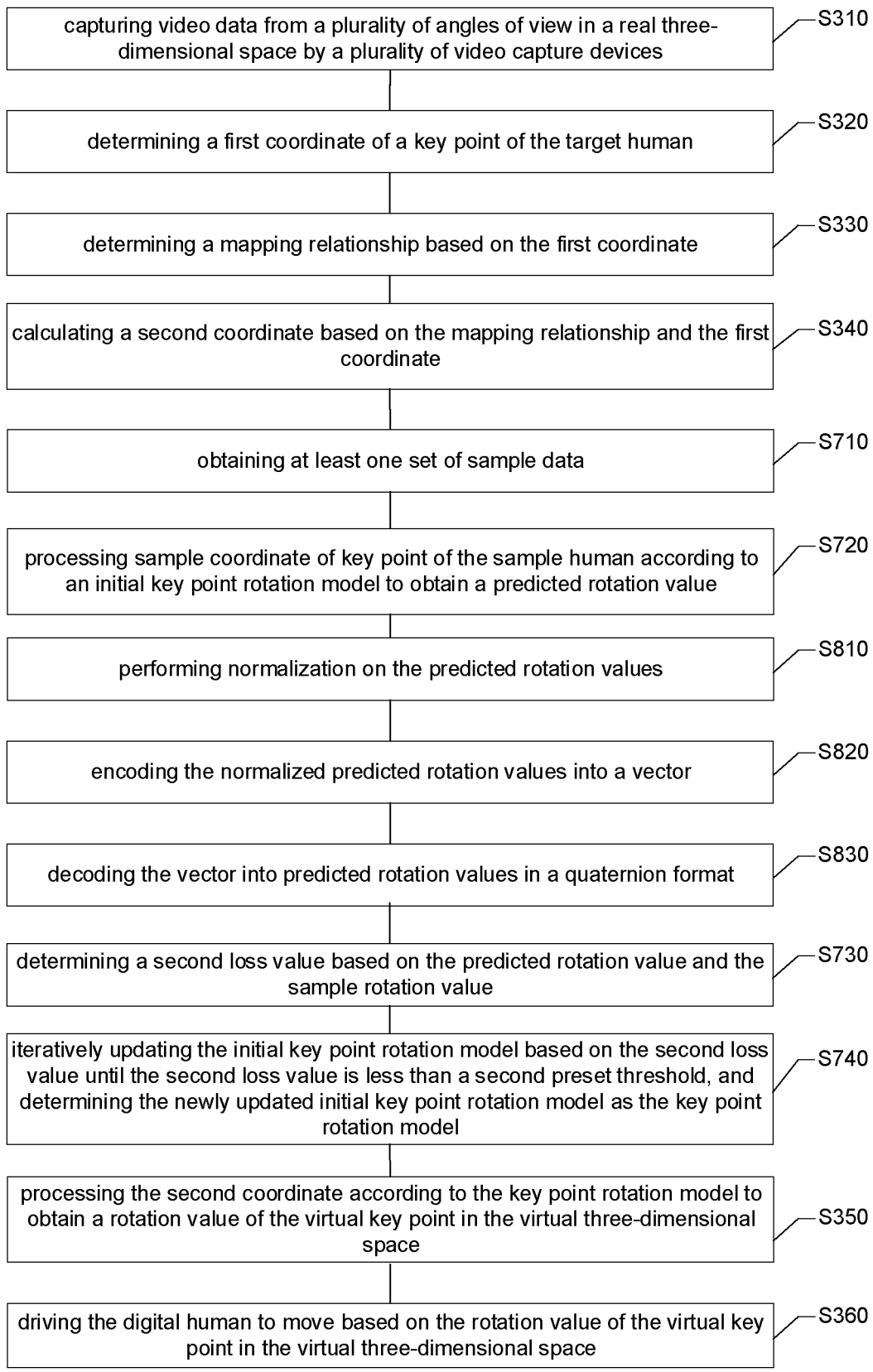
FIG. 8 is a sixth flowchart of a digital human driving method according to an embodiment of the present application.

In some examples, data formats of the sample coordinate and the sample rotation value of the key point of the sample human are in quaternion formats. Based on this, with reference to FIGS. 7 and 8, steps S810 to S830 are executed after step S720.

S810, performing normalization on the predicted rotation values.

In some examples, the predicted rotation values are normalized via a min-max scaling method, reference may be made to the following formula:

$$x_{new} = \frac{x - x_{min}}{x_{max} - x_{min}}$$

Where x is the predicted rotation value before normalization, $X_{new}$ is the predicted rotation value after normalization, $X_{min}$ is the minimum value of the predicted rotation values, and $X_{max}$ is the maximum value of the predicted rotation values.

It is understood that the normalization method as employed is not limited to the min-max scaling method, but may also be a standard score method or other methods, and this application does not make restrictions on the method used for the normalization.

S820, encoding the normalized predicted rotation values into a vector.

In some examples, the normalized predicted rotation values are inputted into an IKNet convolutional network encoder to be encoded into a 1×512 dimensional variable. It is understood that this application does not limit the dimensions of the encoded vector.

S830, decoding the vector into predicted rotation values in a quaternion format.

In some examples, the 1×512 dimensional variable, as an input, is inputted into an IKNet convolutional network decoder for decoding. The IKNet convolutional network decoder converts the 1×512 dimensional vector into a multi-channel feature map. Based on these feature maps, multiple predicted rotation values in the quaternion form are obtained through a series of convolution and pooling operations.

In the above technical solution provided according to steps S810 to S830, the predicted rotation values are normalized, and the normalized predicted rotation values are encoded into a vector, and the vector is then decoded into predicted rotation values in the quaternion format. It can be seen that, in the technical solution, the rotation value is in the quaternion format rather than the matrix or Euler Angle format. Compared with the matrix format, data in a quaternion format is more convenient for storage and calling, because only 4 values are needed to describe a rotation value in the quaternion format, while 9 values are needed to describe the same rotation value in the matrix format. Therefore, the rotation value described in a quaternion format can help to reduce storage pressure on the digital human driving device.

S730, determining a second loss value based on the predicted rotation value and the sample rotation value.

In some examples, the digital human driving device may take a quaternion cosine distance of the predicted rotation value and the sample rotation value as the second loss value. The formula for the quaternion cosine distance is as follows:

$$L_{cos} = 1 - \cos(Q^{GT} * Q^{-1})$$

Wherein, $L_{cos}$ is the quaternion cosine distance between the predicted rotation value and the sample rotation value, $Q^{GT}$ is the sample rotation value, and Q is the predicted rotation value.

In some other examples, the digital human driving device may take a quaternion Euclidean distance of the predicted rotation value and the sample rotation value as the second loss value.

In some other examples, the digital human driving device may take a quaternion normalized loss value of the predicted rotation value and the sample rotation value as the second loss value. It is understood that this application does not make restrictions on the method for determining the second loss value.

S740, iteratively updating the initial key point rotation model based on the second loss value until the second loss value is less than a second preset threshold, and then determining the newly updated initial key point rotation model as the key point rotation model.

In some examples, the second loss value is backpropagated, one or more of loss functions such as the quaternion cosine distance, the quaternion L2 distance, the quaternion normalized loss, and the 3D coordinate L2 distance are backpropagated, calculation is made for calculating gradient for parameters of each component in the model, and the parameters of each component in the model are updated using an Adam optimizer.

It is understood that, after the key point rotation model is obtained through steps S710 to S740, the digital human may be driven to move based on video data of a frame, i.e., first coordinates of key points of an image of a video frame.

In the above technical solution provided according to steps S710 to S740, at least one set of sample data is obtained, and a predicted rotation value is obtained by processing the sample coordinate of the key point of the sample human according to an initial key point rotation model. A second loss value is determined based on the predicted rotation value and the sample rotation value. An initial key point rotation model is iteratively updated based on the second loss value until the second loss value is less than a second preset threshold, and the newly updated initial key point rotation model is determined as the key point rotation model. It can be seen that, the technical solution allows improving precision of the key point rotation model and ensures precision of the synchronous movement of the digital human with the target human.

Figure 9:
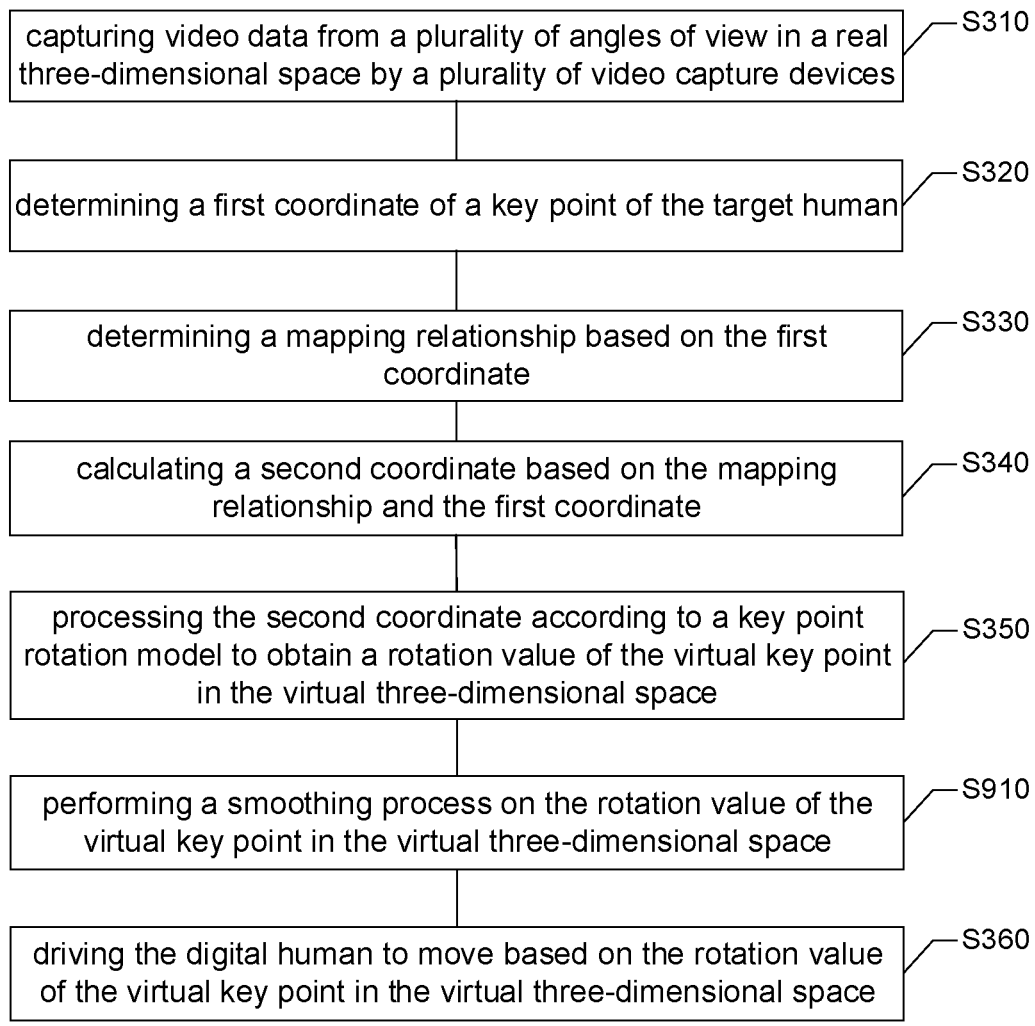
FIG. 9 is a seventh flowchart of a digital human driving method according to an embodiment of the present application.

With reference to FIGS. 3 and 9, step S910 is performed before step S360.

S910, performing a smoothing process on the rotation value of the virtual key point in the virtual three-dimensional space.

In some examples, a Savgol algorithm is used to smooth the rotation values. The process may include: representing the rotation values as a time sequence, with each time point corresponding to a rotation value; determining parameters, i.e., window size, polynomial order and derivative order, of the Savgol filter according to actual needs; performing a filtering operation on the rotation values to obtain a smoothed time sequence; and recombining the smoothed time sequence into rotation values to obtain smoothed rotation values.

In the above technical solution provided according to S910, the rotation values of the virtual key points in the virtual three-dimensional space are smoothed, which can reduce noise, eliminate data spikes, and improve the action stability when the digital human driving device is driving the digital human.

S360, driving the digital human to move based on the rotation value of the virtual key point in the virtual three-dimensional space.

In the technical solutions provided according to steps S310 to S360, firstly, multiple video capture devices are used to capture video data of a target human from multiple angles of view in a real three-dimensional space, so as to solve the problems of visible shaking, joint malposition, and partial part loss of the digital human during the driving process due to some key points of the target human cannot be detected in the case of single view angle of the video data. Secondly, the first coordinate of the key point of the target human is determined, and a mapping relationship is determined based on the first coordinate, where the mapping relationship is a correspondence between the key point and a virtual key point in a virtual three-dimensional space, that is, the process of determining the mapping relationship is the process of position calibration of the video capture device, therefore in the present technical solution, calibration is completed based on the first coordinate of the key point of the target human in the video data from multiple angles of view without a calibration plate, and thus laying cost of the calibration plate is saved. Finally, the second coordinate is calculated based on the mapping relationship and the first coordinate, and the second coordinate is processed according to a key point rotation model, to obtain a rotation value of the virtual key point in the virtual three-dimensional space, and the digital human is driven to move based on the rotation value of the virtual key point in the virtual three-dimensional space, in this way, the rotation values of all the key points are obtained simultaneously by processing the second coordinates according to the key point rotation model, thereby improving efficiency of driving the digital human.

As can be seen, on the one hand, with the technical solution provided according to the present application, the problems of visible shaking, joint malposition, and partial part loss of the digital human during the driving process due to some key points of the target human cannot be detected in the case of single angle of view of the video data can be solved. On the other hand, with the technical solution provided according to the present application, calibration can be completed based on the first coordinate of the key point of the target human in the video data from multiple angles of view without a calibration plate, and thus laying cost of the calibration plate is saved. In addition, with the technical solution provided according to the present application, efficiency of driving the digital human is improved.

Figure 10:
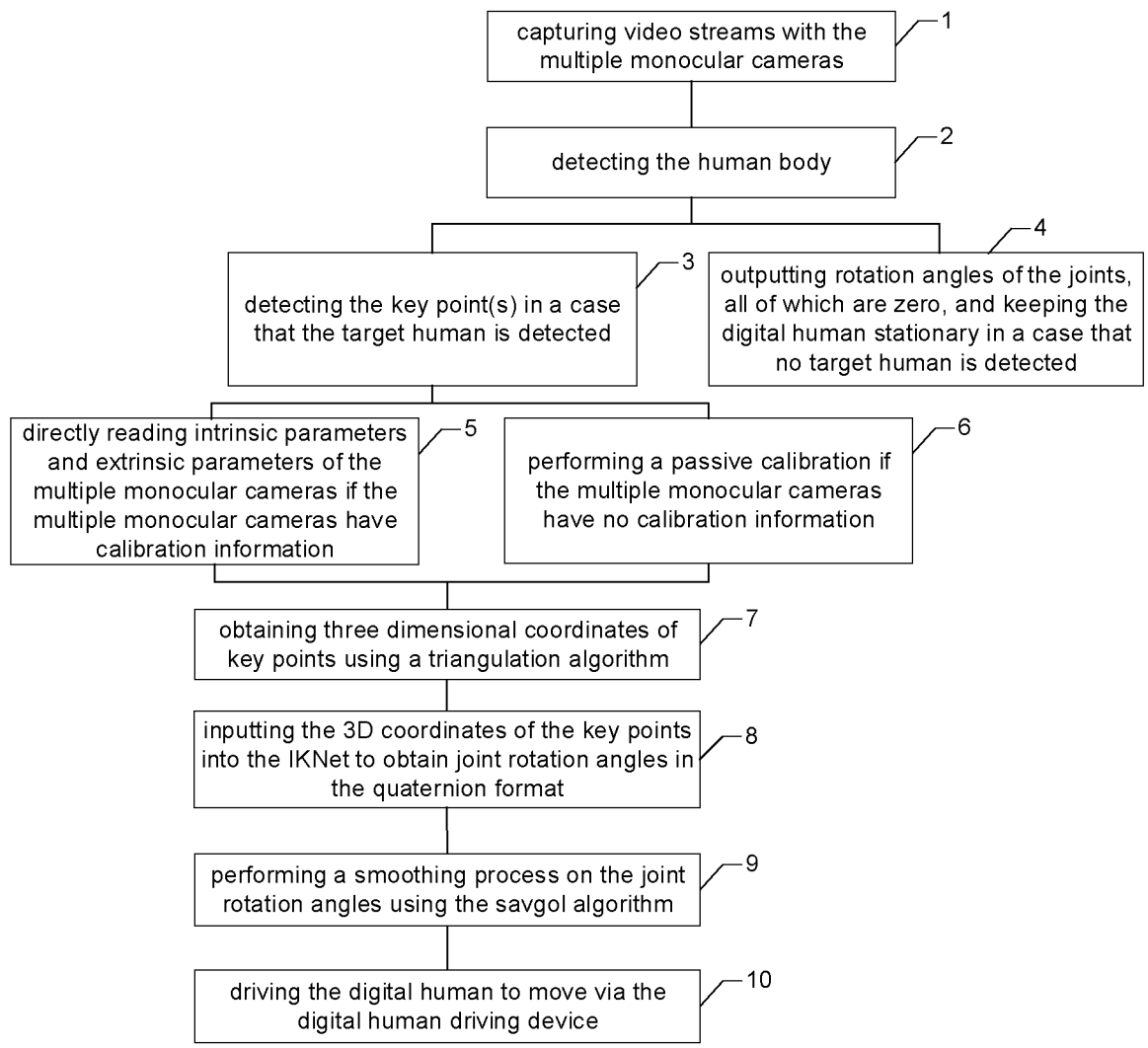
FIG. 10 is an exemplary schematic diagram of another digital human driving method according to an embodiment of the present application.

In order to illustrate the technical solutions provided according to the embodiments of the present application in further details, the case in which the video capture devices are multiple monocular cameras, the first parameter matrix is a matrix of extrinsic parameters of the camera, the second parameter matrix is a matrix of intrinsic parameters of the camera, and the key point selection model is an IKNet is taken as an example, and the digital human driving method provided according to the present application may include a process as shown in FIG. 10, which may specifically include the followings.

1. Capturing Video Streams with the Multiple Monocular Cameras.

For example, multiple monocular cameras are set up. N is the number of the cameras, and N is greater than 2. The target human is located in the capturing range of the multiple monocular cameras. The target human firstly stands upright (in a standby pose) to wait for camera calibration (obtaining a first parameter). After the target human stands upright, the multiple monocular cameras begin to capture video streams, each monocular camera having a different angle of view and outputting a video data of action of the target human within the capturing range of the monocular camera, respectively. Wherein, the video data has an audio bitrate of 128 kb/s and an audio sampling rate of 44100 Hz.

2. Detecting the Human Body.

For example, firstly, the digital human driving device, based on the video data captured by the multiple monocular cameras, obtains an image of video frame of the video data as an original image, and converts the original image into a black-and-white grayscale image so as to more easily separate the target human and the background in the original image. The digital human driving device then identifies edge features in the black-and-white grayscale image using an edge detection algorithm, and then binarizes the edge features to get a binary image. The digital human driving device then extracts a contour of the target human and other contours from the binary image using a contour find algorithm, and then filters out other contours to get the contour of the target human.

3. Detecting the key point(s) in a case that the target human is detected.

For example, for each video frame of the video data captured by each monocular camera, 21 2D key points of the human body are calculated using a HRNet algorithm, and 2D coordinates (the first coordinates) of the 2D key points are outputted, with the shape being N×21×2.

4. Outputting rotation angles of the joints, all of which are zero, and keeping the digital human stationary, in a case that no target human is detected.

For example, in the case that no contour of the target human is detected in the above process 3, the digital human driving device outputs rotation angles of all the joints being "0" and keeps the digital human stationary.

5. Directly reading intrinsic parameters and extrinsic parameters of the multiple monocular cameras if the multiple monocular cameras have calibration information.

For example, if the multiple monocular cameras have calibration information (the first parameter matrix and the second parameter matrix), the digital human driving device directly accesses the storage module of each monocular camera in a wired or wireless manner to obtain the calibration information.

6. Performing a passive calibration if the multiple monocular cameras have no calibration information.

Figure 11:
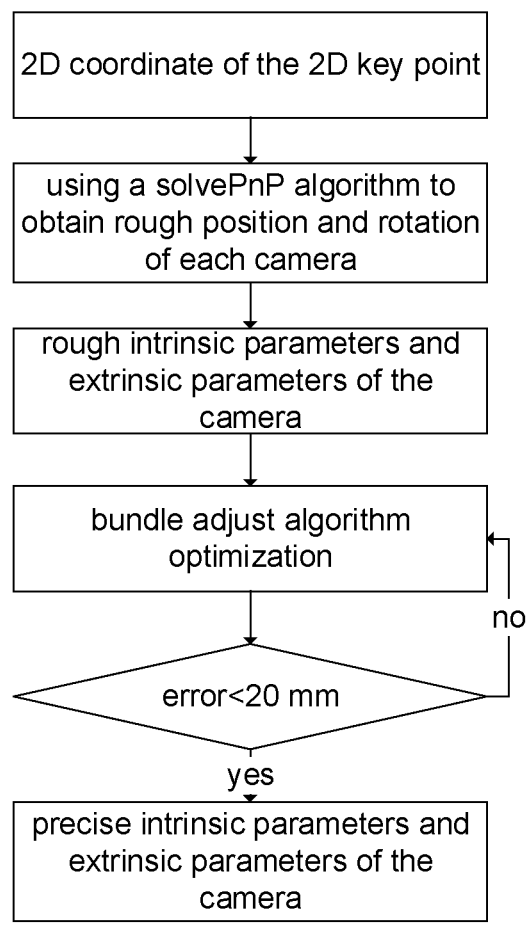
FIG. 11 is a schematic diagram of a passive calibration process of another digital human driving method according to an embodiment of the present application.

For example, with reference to the passive calibration process shown in FIG. 11, in particular, the digital human driving device firstly obtains rough position and rotation (the initial first parameter matrix) of each camera using the solvePnP algorithm and the LM algorithm based on 2D coordinates (the first coordinates) of 2D key points extracted from one of the above frames and ex-factory preset intrinsic parameters and distortion coefficient (the second parameter matrix, a shape of the intrinsic parameter data being 3×3, a shape of the distortion coefficient being 1×5) of the camera, wherein, a shape of the position vector is 1×3 and a shape of the rotation vector is 1×3. The digital human driving device then obtains more frames from the video stream, about 90 frames for 3 seconds, extracts 2D coordinates of 21 joints of the human body from each frame, to perform optimization for obtaining precise parameters of the camera, wherein, the data shape is N×90×21×2 and is transformed into N×1809×2, totally 1809 sets of data. Finally, the digital human driving device optimizes the obtained rough position and rotation of the camera using a bundle adjust algorithm and an LM algorithm, so as to obtain precise intrinsic parameters (the second parameter matrix) and extrinsic parameters (the first parameter matrix) of the camera, thus completing the passive calibration, wherein, 500 sets of data are randomly selected each time and 20 times of iteration are performed until a reprojection error (the first loss value) is less than 20 mm (the first preset threshold).

7. Obtaining three dimensional coordinates of key points using a triangulation algorithm.

For example, 2D coordinates (the first coordinates) of key points of 21 joints, with a data shape of N×21×2, are extracted through the HRNet, and 3D coordinates (the third coordinates) of the 21 joints of the human body are obtained using a triangulation algorithm, with the data shape being N×21×3.

8. Inputting the 3D coordinates of the key points into the IKNet to obtain joint rotation angles in a quaternion format.

Figure 12:
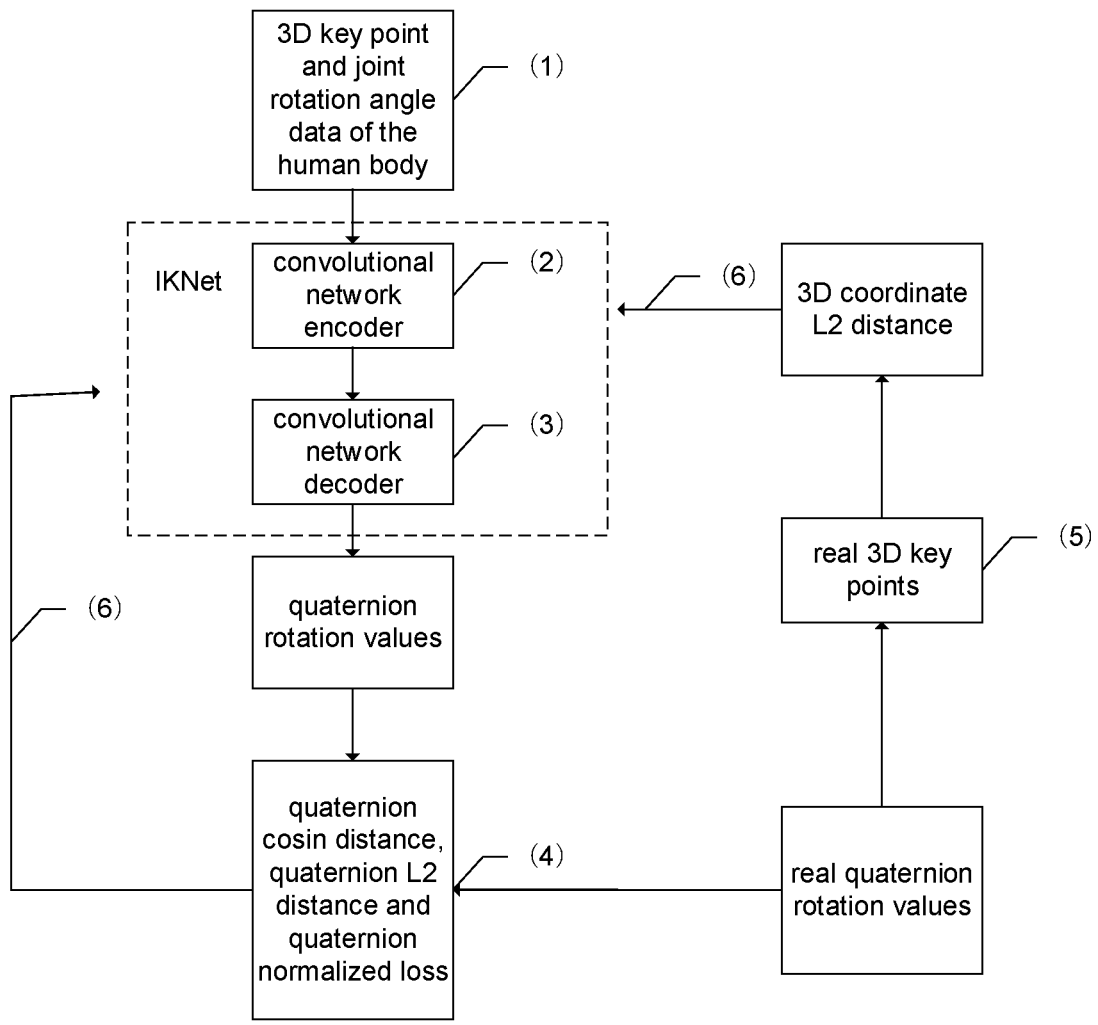
FIG. 12 is a schematic diagram of an IKNet training process of another digital human driving method according to an embodiment of the present application.

For example, as shown in FIG. 12, the process of inputting the 3D coordinates of the key points into the IKNet to obtain the joint rotation angles in the quaternion format includes:

(1) obtaining pairs of data of 3D key points (sample coordinates) and joint rotation angle (sample rotation values) of the human body by a motion capture device, a data shape of 3D key points of the human in each frame being 1×21×3; and performing normalization process of the data such that it is between 0 to 1.

(2) inputting the data into an IKNet convolutional network encoder to encode the data into a 1×512 dimensional variable.

(3) inputting the above 1×512 dimensional variable into an IKNet convolutional network decoder, to output joint rotation angles of the 21 joints in a quaternion format, with the shape of the output data being 1×21×4.

(4) calculating three loss functions (the second loss value), i.e., a quaternion cosine distance, a quaternion L2 distance and a quaternion normalized loss, by comparing the quaternion rotation values (the predicted rotation values) output by the model with the quaternion rotation values (sample rotation values) captured by the motion capture devices.

(5) transforming the quaternions of the 21 joints output by the model into 3D key points by using a forward Kinematics (FK) algorithm, with the shape of the 3D key points being 1×21×3, and calculating 3D coordinate L2 distance between the transformed 3D key points and the inputted 3D key points.

(6) performing a back propagation process, to back propagate four loss functions: the quaternion cosine distance, the quaternion L2 distance, the quaternion normalized loss, and the 3D coordinate L2 distance, and calculating gradients of parameters of each component in the model, and updating the parameters of each component in the model by using an Adam optimizer.

(7) performing several rounds of the model training process, wherein the above model training process is performed for each round until the training termination condition is met and thus the model training is completed.

9. Performing a smoothing process on the joint rotation angles using the savgol algorithm.

For example, the rotation values are represented as a time sequence, with each time point corresponding to a rotation value; parameters of a Savgol filter are determined according to actual needs, that is, a window size, a polynomial order and a derivative order; a filtering operation is performed on the rotation values to obtain a smoothed time sequence; and the smoothed time sequence is recombined into rotation values to obtain smoothed rotation values.

10. Driving the digital human to move via the digital human driving device.

The above mainly introduces the solutions provided according to the embodiments of the present application from the perspective of method. In order to achieve the above functions, hardware architecture and/or software modules that perform each function are included. It should be apparent to those skilled in the art that, in combination with the units and steps of the various implementations described in the embodiments disclosed herein, this application can be implemented in hardware or in a combination of hardware and computer software. Whether a function is performed in hardware or computer software driving hardware depends on the specific application and design constraints of the technical solution. Technical professionals can use different methods for different particular applications to achieve the described functions, and such implementations should not be considered as going beyond the scope of this application.

In the embodiments of the present application, division of functional modules of the digital human driving device may be made according to the above method embodiments. For example, corresponding functional module may be obtained according to each function, or two or more functions may be integrated into one processing module. The integrated module may be implemented in the form of hardware, or in the form of software function modules. It should be noted that the division of modules in the embodiments of this application is schematic and is only a logical function division, and there may be other division manners when actually implemented.

Figure 13:
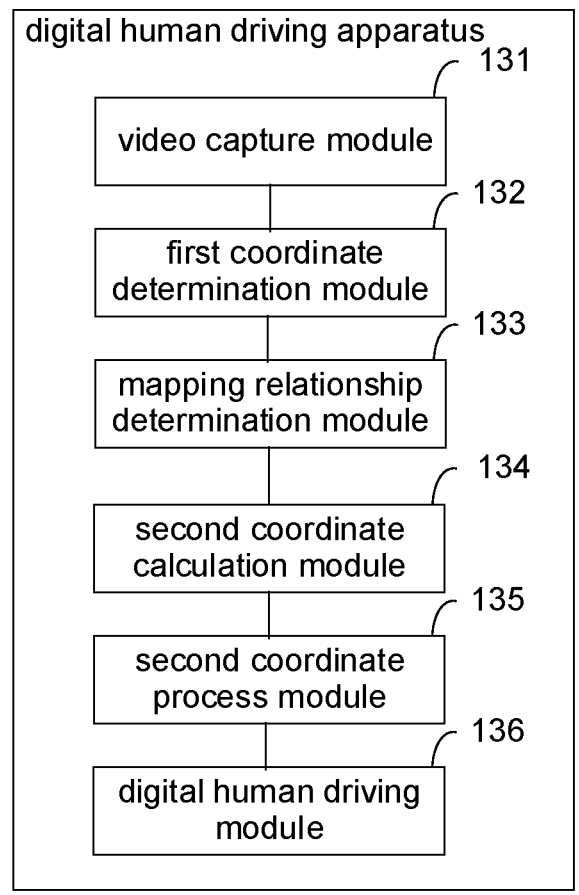
FIG. 13 is a structural schematic diagram of another digital human driving device according to an embodiment of the present application.

As shown in FIG. 13, a digital human driving apparatus is provided according to an embodiment of the present application. The digital human driving apparatus includes a video capture module 131, a first coordinate determination module 132, a mapping relationship determination module 133, a second coordinate calculation module 134, a second coordinate process module 135 and a digital human driving module 136.

The video capture module 131 is configured to capture video data from a plurality of angles of view in a real three-dimensional space by a plurality of video capture devices, wherein the video data comprises a target human. The first coordinate determination module 132 is configured to determine a first coordinate of a key point of the target human in the video data captured by the video capture module, wherein the first coordinate is a two-dimensional coordinate of the key point in a video frame of the video data. The mapping relationship determination module 133 is configured to determine a mapping relationship based on the first coordinate determined by the first coordinate determination module, wherein, the mapping relationship is a correspondence between the key point and a virtual key point in a virtual three-dimensional space. The second coordinate calculation module 134 is configured to calculate a second coordinate based on the mapping relationship determined by the mapping relationship determination module and the first coordinate determined by the first coordinate determination module, wherein, the second coordinate is a three-dimensional coordinate of the virtual key point in the virtual three-dimensional space. The second coordinate process module 135 is configured to process the second coordinate obtained by the second coordinate calculation module according to a key point rotation model to obtain a rotation value of the virtual key point in the virtual three-dimensional space. The digital human driving module 136 is configured to drive the digital human to move based on the rotation value of the virtual key point in the virtual three-dimensional space obtained by the second coordinate process module.

In a possible implementation, after capturing the video data from the plurality of angles of view in the real three-dimensional space by the plurality of video capture devices, the digital human driving apparatus is further configured to: detect a target human in the video data; determine the key point of the target human in case that a target human is detected; and maintain the digital human in a standby pose in case that no target human is detected.

In a possible implementation, for determining the mapping relationship based on the first coordinate, the mapping relationship determination module 133 is configured to: determine a first parameter matrix based on the first coordinate of the key point, wherein the first parameter matrix indicates a transformation relationship of transforming a position point in the real three-dimensional space from a first coordinate system to a second coordinate system, the first coordinate system is a three-dimensional coordinate system in the real three-dimensional space with a center of the target human as an origin, and the second coordinate system is a three-dimensional coordinate system in the real three-dimensional space with an optical center of the video capture device as an origin; obtain a second parameter matrix, wherein the second parameter matrix indicates a transformation relationship of transforming a position point in the real three-dimensional space from the second coordinate system to a third coordinate system, and the third coordinate system is a coordinate system with an image center of video frame of the video data as an origin; and take a product matrix of the first parameter matrix and the second parameter matrix as the mapping relationship.

In a possible implementation, for determining the first parameter matrix based on the first coordinate of the key point, the mapping relationship determination module 133 is configured to: determine an initial first parameter matrix based on the first coordinate of the key point; obtain a third coordinate of the key point, wherein the third coordinate is a three-dimensional coordinate of the key point in the real three-dimensional space; calculate a first predicted coordinate value based on the third coordinate and the initial first parameter matrix; determine a first loss value based on the first predicted coordinate value and the first coordinate; and iteratively update the initial first parameter matrix based on the first loss value until the first loss value is less than a first preset threshold, and determine the newly updated initial first parameter matrix as the first parameter matrix.

In a possible implementation, before processing the second coordinate according to the key point rotation model to obtain rotation value of the virtual key point in the virtual three-dimensional space, the digital human driving apparatus is further configured to: obtain at least one set of sample data, wherein the sample data comprises a sample coordinate and a sample rotation value of a key point of a sample human in a sample video, and the sample coordinate is a two-dimensional coordinate of the key point of the sample human in a video frame of the sample video; process the sample coordinate of the key point of the sample human according to an initial key point rotation model to obtain a predicted rotation value; determine a second loss value based on the predicted rotation value and the sample rotation value; iteratively update the initial key point rotation model based on the second loss value until the second loss value is less than a second preset threshold, and determine the newly updated initial key point rotation model as the key point rotation model.

In a possible implementation, data formats of the sample coordinate and the sample rotation value of the key point of the sample human are in quaternion formats.

In a possible implementation, after processing the second coordinate according to the key point rotation model to obtain the rotation value of the virtual key point in the virtual three-dimensional space and before driving the digital human to move based on the rotation value of the virtual key point in the virtual three-dimensional space, the digital human driving apparatus is further configured to perform a smoothing process on the rotation value of the virtual key point in the virtual three-dimensional space.

It should be understood that division of units or modules (hereinafter collectively referred to as units) in the above apparatus is only division of logical functions, which may be fully or partially integrated into one physical entity or may be physically separated in actual implementation. All units in the apparatus may be implemented in the form of software which may be called by processing elements, or may be implemented in the form of hardware. Or some units are implemented in the form of software which may be called by processing elements and some units are implemented in the form of hardware.

For example, each unit may be a separate processing element, or may be integrated into a chip of the apparatus. In addition, the unit may be stored in a memory in the form of programs, which may be called by a processing element of the apparatus to perform the function of the unit. In addition, the units may be all or partly integrated together or be implemented separately. The processing element referred to herein may also be called a processor that may be an integrated circuit with signal processing capability. In the implementation, the steps of the above method or the above units may be implemented through integrated logic circuit of hardware in the processing element or through software which may be called by the processing element.

In one example, the units in the apparatus may be one or more integrated circuits configured to implement the above method, such as one or more ASIC, or one or more DSP, or one or more FPGA, or any combination thereof.

As another example, when the units in the apparatus are implemented in the form of a program which may be called by the processing element, the processing element may be a general-purpose processor, such as a CPU or other processor that can call a program. As another example, the units may be integrated together in the form of system-on-chip SOC.

In an implementation, the units of the apparatus for implementing the corresponding steps of the above method may be implemented in the form of a program which may be called by a processing element. For example, the apparatus may include a processing element and a storage element, and the processing element calls a program stored in the storage element to perform the digital human driving method of the above embodiments. The storage element may be a storage element on the same chip as the processing element, that is, an on-chip storage element.

In another implementation, a program for performing the above method may be in a storage element that is on a different chip from the processing element, i.e., an off-chip storage element. In this case, the processing element calls or loads a program from the off-chip storage element to the on-chip storage element to call and execute the digital human driving method according to the above embodiments.

Figure 14:
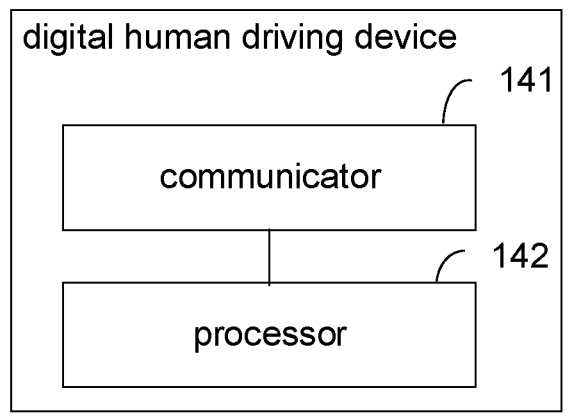
FIG. 14 is a structural schematic diagram of yet another digital human driving device according to an embodiment of the present application.

As shown in FIG. 14, a digital human driving device is provided according to an embodiment of the present application. The digital human driving device includes a communicator 141 configured to capture video data from a plurality of angles of view in a real three-dimensional space via a plurality of video capture devices, wherein the video data comprises a target human. The digital human driving device further includes a processor 142 coupled with the communicator and configured to determine a first coordinate of a key point of the target human, wherein the first coordinate is a two-dimensional coordinate of the key point in a video frame of the video data; determine a mapping relationship based on the first coordinate, wherein the mapping relationship is a correspondence between the key point and a virtual key point in a virtual three-dimensional space; calculate a second coordinate based on the mapping relationship and the first coordinate, wherein the second coordinate is a three-dimensional coordinate of the virtual key point in the virtual three-dimensional space; process the second coordinate according to a key point rotation model to obtain a rotation value of the virtual key point in the virtual three-dimensional space; and drive the digital human to move based on the rotation value of the virtual key point in the virtual three-dimensional space.

In a possible implementation, after capturing the video data from the plurality of angles of view in the real three-dimensional space by the plurality of video capture devices, the processor 142 is further configured to: detect the target human in the video data; determine the key point of the target human in response to a case of the target human being detected; and maintain the digital human in a standby pose in response to a case of no target human being detected.

In a possible implementation, for determining the mapping relationship based on the first coordinate, the processor 142 is configured to: determine a first parameter matrix based on the first coordinate of the key point, wherein the first parameter matrix indicates a transformation relationship of transforming a position point in the real three-dimensional space from a first coordinate system to a second coordinate system, the first coordinate system is a three-dimensional coordinate system in the real three-dimensional space with a center of the target human as an origin, and the second coordinate system is a three-dimensional coordinate system in the real three-dimensional space with an optical center of the video capture device as an origin; obtain a second parameter matrix, wherein the second parameter matrix indicates a transformation relationship of transforming a position point in the real three-dimensional space from the second coordinate system to a third coordinate system, and the third coordinate system is a coordinate system with an image center of the video frame of the video data as an origin; and determine a product matrix of the first parameter matrix and the second parameter matrix as the mapping relationship.

In a possible implementation, for determining the first parameter matrix based on the first coordinate of the key point, the processor 142 is configured to: determine an initial first parameter matrix based on the first coordinate of the key point; obtain a third coordinate of the key point, wherein the third coordinate is a three-dimensional coordinate of the key point in the real three-dimensional space; calculate a first predicted coordinate value based on the third coordinate and the initial first parameter matrix; determine a first loss value based on the first predicted coordinate value and the first coordinate; and iteratively update the initial first parameter matrix based on the first loss value until the first loss value is less than a first preset threshold, and determine the newly updated initial first parameter matrix as the first parameter matrix.

In a possible implementation, before processing the second coordinate according to the key point rotation model to obtain the rotation value of the virtual key point in the virtual three-dimensional space, the processor 142 is further configured to: obtain at least one set of sample data, where the sample data comprises a sample coordinate and a sample rotation value of a key point of a sample human in a sample video, and the sample coordinate is a two-dimensional coordinate of the key point of the sample human in a video frame of the sample video; process the sample coordinate of the key point of the sample human according to an initial key point rotation model to obtain a predicted rotation value; determine a second loss value based on the predicted rotation value and the sample rotation value; iteratively update the initial key point rotation model based on the second loss value until the second loss value is less than a second preset threshold, and determine the newly updated initial key point rotation model as the key point rotation model.

In a possible implementation, data formats of the sample coordinate and the sample rotation value of the key point of the sample human are quaternion formats.

In a possible implementation, after inputting the second coordinate into the key point rotation model to output the rotation value of the virtual key point in the virtual three-dimensional space and before driving the digital human to move based on the rotation value of the virtual key point in the virtual three-dimensional space, the processor 142 is further configured to perform a smoothing process on the rotation value of the virtual key point in the virtual three-dimensional space.

Another digital human driving device is provided according to an embodiment of the present application. The digital human driving device may include a display screen, a memory and one or more processor coupled together. The memory is configured to store computer program codes that include computer instructions. When the processor executes the computer instructions, the digital human driving device can perform the various functions or steps performed by the digital human driving device in the above method embodiments.

For example, it is also provided according to an embodiment of the present application a chip which may be applied to the above digital human driving device or a server. The chip includes one or more interface circuit and one or more processor. The interface circuit and the processor are interconnected through wires. The processor receives computer instructions from the memory of the digital human driving device through the interface circuit and executes the computer instructions to implement the method according to the above method embodiments.

It is also provided according to an embodiment of the present application a computer readable storage medium on which computer program instructions (or instructions) are stored. When the computer program instructions are executed by the digital human driving device, the digital human driving device is enable to implement the digital human driving method as described above.

A computer program product is also provided according to an embodiment of the present application. The computer program product includes computer instructions as may be executed by the above digital human driving device. When the computer program product is run in the digital human driving device, the digital human driving device is enabled to implement the above digital human driving method.

Through the above description of the embodiments, those skilled in the art can easily understand that, for convenience and simplicity of the description, division of the above functional modules is only illustrated for example. In practical application, the functions may be assigned to different functional modules according to actual needs, in other words, internal structure of the apparatus may be divided into different functional modules, so as to perform all or part of the functions described above.

It should be understood that the apparatus and methods disclosed in the embodiments of the present application may be implemented in other manners. For example, the apparatus embodiments described above are only schematic, and for example, the division of modules or units is only a logical function division, and the modules or units may be divided in other ways in actual implementation, for example, multiple units or components may be combined or integrated into another apparatus, or some features may be ignored or not performed. In addition, coupling or direct coupling or communication connection among the devices or units illustrated or discussed above may be made through certain interfaces, and indirect coupling or communication connection among the devices or units may be in an electrical, mechanical or other form.

The units described as separate parts may or may not be physically separate, and the parts shown as a unit may be one physical unit or multiple physical units, they may be located in one place or distributed in multiple different places. Some or all of the units may be chosen to achieve the purpose of the solutions of the embodiment according to actual needs.

In addition, the functional units in the embodiments of the present application may be integrated into a single processing unit or may exist separately and physically, or two or more units may be integrated into a single unit. The integrated unit may be realized either in the form of hardware or in the form of software functional units.

If the integrated units are implemented as functional units of software and sold or used as a stand-alone product, it may be stored in a readable storage medium. Based on this, the technical solution of the embodiments of the present application, or the part of the technical solution that contributes to the prior art, or all or part of the technical solution, may be embodied in the form of a software product, such as a program. The software product is stored in a program product such as a computer readable storage medium, and includes several instructions to cause a device (which may be a single chip microcomputer, a chip, etc.) or a processor to perform all or part of the steps of the method according to the embodiments of the present application. The aforementioned storage medium may include: a USB flash disk, a mobile hard disk, a ROM, a RAM, a disk, a CD (compact disc) or other medium that can store program codes.

The above are only specific embodiments of the present application, and the protection scope of protection of this application is not limited to the above embodiments. Any change or variation within the technical scope disclosed in this application shall fall within the protection scope of this application. Therefore, the protection scope of this application shall be determined by the protection scope of the claims.

What is claimed is:

1. A digital human driving method, comprising the steps of:
   capturing video data from a plurality of angles of view in a real three-dimensional space by a plurality of video capture devices, wherein the video data comprises a target human;
   determining a first coordinate of a key point of the target human, wherein the first coordinate is a two-dimensional coordinate of the key point in a video frame of the video data;
   determining a mapping relationship based on the first coordinate, wherein the mapping relationship is a correspondence between the key point and a virtual key point in a virtual three-dimensional space;
   calculating a second coordinate based on the mapping relationship and the first coordinate, wherein the second coordinate is a three-dimensional coordinate of the virtual key point in the virtual three-dimensional space;
   processing the second coordinate according to a key point rotation model to obtain a rotation value of the virtual key point in the virtual three-dimensional space; and
   driving a digital human to move based on the rotation value of the virtual key point in the virtual three-dimensional space,
   wherein determining the mapping relationship based on the first coordinate comprises: determining a first parameter matrix based on the first coordinate of the key point, wherein the first parameter matrix indicates a transformation relationship of transforming a position point in the real three-dimensional space from a first coordinate system to a second coordinate system, the first coordinate system is a three-dimensional coordinate system in the real three-dimensional space with a center of the target human as an origin, and the second coordinate system is a three-dimensional coordinate system in the real three-dimensional space with an optical center of the video capture device as an origin; obtaining a second parameter matrix, wherein the second parameter matrix indicates a transformation relationship of transforming a position point in the real three-dimensional space from the second coordinate system to a third coordinate system, and the third coordinate system is a coordinate system with an image center of video frame of the video data as an origin; and determining a matrix of a product of the first parameter matrix and the second parameter matrix as the mapping relationship, and
   wherein determining the first parameter matrix based on the first coordinate of the key point comprises: determining an initial first parameter matrix based on the first coordinate of the key point; obtaining a third coordinate of the key point, wherein the third coordinate is a three-dimensional coordinate of the key point in the real three-dimensional space; calculating a first predicted coordinate value based on the third coordinate and the initial first parameter matrix; determining a first loss value based on the first predicted coordinate value and the first coordinate; and iteratively updating the initial first parameter matrix based on the first loss value until the first loss value is less than a first preset threshold, and determining a newly updated initial first parameter matrix as the first parameter matrix.

2. The method according to claim 1, wherein after capturing the video data from the plurality of angles of view in the real three-dimensional space by the plurality of video capture devices, the method further comprises:
   detecting the target human in the video data;
   determining the key point of the target human in a case that the target human is detected; and
   maintaining the digital human in a standby pose in a case that no target human is detected.

3. The method according to claim 1, wherein before processing the second coordinate according to the key point rotation model to obtain the rotation value of the virtual key point in the virtual three-dimensional space, the method comprises:
   obtaining at least one set of sample data, wherein the sample data comprises a sample coordinate and a sample rotation value of a key point of a sample human in a sample video, and the sample coordinate is a two-dimensional coordinate of the key point of the sample human in a video frame of the sample video;
   processing the sample coordinate of the key point of the sample human according to an initial key point rotation model to obtain a predicted rotation value;
   determining a second loss value based on the predicted rotation value and the sample rotation value; and
   iteratively updating the initial key point rotation model based on the second loss value until the second loss value is less than a second preset threshold, and determining a newly updated initial key point rotation model as the key point rotation model.

4. The method according to claim 3, wherein data formats of the sample coordinate and the sample rotation value of the key point of the sample human are in quaternion formats.

5. The method according to claim 1, wherein after processing the second coordinate according to the key point rotation model to obtain the rotation value of the virtual key point in the virtual three-dimensional space and before driving the digital human to move based on the rotation value of the virtual key point in the virtual three-dimensional space, the method further comprises:

performing a smoothing process on the rotation value of the virtual key point in the virtual three-dimensional space.

6. A computer-readable storage medium, wherein the computer-readable storage medium is stored with instructions which, when being executed by a processor of a digital human driving device, enable the digital human driving device to perform the digital human driving method according to claim 1.

7. A digital human driving apparatus, comprising:
a video capture module, configured to capture video data from a plurality of angles of view in a real three-dimensional space by a plurality of video capture devices, wherein the video data comprises a target human;
a first coordinate determination module, configured to determine a first coordinate of a key point of the target human in the video data captured by the video capture module, wherein the first coordinate is a two-dimensional coordinate of the key point in a video frame of the video data;
a mapping relationship determination module, configured to determine a mapping relationship based on the first coordinate determined by the first coordinate determination module, wherein the mapping relationship is a correspondence between the key point and a virtual key point in a virtual three-dimensional space;
a second coordinate calculation module, configured to calculate a second coordinate based on the mapping relationship determined by the mapping relationship determination module and the first coordinate determined by the first coordinate determination module, wherein the second coordinate is a three-dimensional coordinate of the virtual key point in the virtual three-dimensional space;
a second coordinate process module, configured to process the second coordinate obtained by the second coordinate calculation module according to a key point rotation model to obtain a rotation value of the virtual key point in the virtual three-dimensional space; and
a digital human driving module, configured to drive the digital human to move based on the rotation value of the virtual key point in the virtual three-dimensional space obtained by the second coordinate process module,
wherein the mapping relationship determination module is further configured to determine a first parameter matrix based on the first coordinate of the key point, wherein the first parameter matrix indicates a transformation relationship of transforming a position point in the real three-dimensional space from a first coordinate system to a second coordinate system, the first coordinate system is a three-dimensional coordinate system in the real three-dimensional space with a center of the target human as an origin, and the second coordinate system is a three-dimensional coordinate system in the real three-dimensional space with an optical center of the video capture device as an origin; obtain a second parameter matrix, wherein the second parameter matrix indicates a transformation relationship of transforming a position point in the real three-dimensional space from the second coordinate system to a third coordinate system, and the third coordinate system is a coordinate system with an image center of video frame of the video data as an origin; and determine a matrix of a product of the first parameter matrix and the second parameter matrix as the mapping relationship, and
wherein the mapping relationship determination module is further configured to determine the first parameter matrix based on the first coordinate of the key point by: determining an initial first parameter matrix based on the first coordinate of the key point; obtaining a third coordinate of the key point, wherein the third coordinate is a three-dimensional coordinate of the key point in the real three-dimensional space; calculating a first predicted coordinate value based on the third coordinate and the initial first parameter matrix; determining a first loss value based on the first predicted coordinate value and the first coordinate; and iteratively updating the initial first parameter matrix based on the first loss value until the first loss value is less than a first preset threshold, and determining a newly updated initial first parameter matrix as the first parameter matrix.

* * * * *